United States Patent
Geva et al.

(10) Patent No.: US 12,184,465 B1
(45) Date of Patent: Dec. 31, 2024

(54) AMPLITUDE MIRRORING DETECTION USING ADDITIONAL SHARED INFORMATION

(71) Applicant: QUALCOMM Incorporated, San Diego, CA (US)

(72) Inventors: Tomer Geva, Kiryat Ono (IL); Idan Michael Horn, Hod Hasharon (IL); Shay Landis, Hod Hasharon (IL); Jacob Pick, Mevaseret Zion (IL); Peer Berger, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 18/345,267

(22) Filed: Jun. 30, 2023

(51) Int. Cl.
*H04L 27/26* (2006.01)
(52) U.S. Cl.
CPC .................. *H04L 27/2624* (2013.01)
(58) Field of Classification Search
CPC .......... H04L 27/2623; H04L 27/2624
See application file for complete search history.

(56) References Cited

U.S. PATENT DOCUMENTS

| | | | |
|---|---|---|---|
| 8,503,950 B1 * | 8/2013 | Dick | H04B 1/0475 455/208 |
| 10,069,659 B2 * | 9/2018 | Martinez | H04L 25/0384 |
| 2016/0248458 A1 * | 8/2016 | Sridhar | H03F 3/24 |
| 2017/0005844 A1 * | 1/2017 | Kang | H04L 27/2615 |
| 2019/0140605 A1 * | 5/2019 | Hong | H03F 1/3247 |
| 2021/0377088 A1 * | 12/2021 | Gaal | H04W 72/0453 |

\* cited by examiner

*Primary Examiner* — Freshteh N Aghdam
(74) *Attorney, Agent, or Firm* — Holland & Hart LLP

(57) ABSTRACT

Methods, systems, and devices for wireless communications are described. A transmitting device or a receiving device may indicate support for crest factor reduction (CFR) techniques using clipping and mirroring. The transmitting device may indicate a clipping level and a mirroring level for a CFR function. The transmitting device may generate a waveform in accordance with the CFR function and may transmit the waveform to the receiving device. The receiving device may monitor the waveform to detect one or more mirrored portions of the waveform. The receiving device may invert the one or more mirrored portions of the waveform over the mirroring level to restore and decode the waveform.

30 Claims, 13 Drawing Sheets

AMPLITUDE MIRRORING DETECTION USING ADDITIONAL SHARED INFORMATION

FIELD OF TECHNOLOGY

The following relates to wireless communications, including amplitude mirroring detection using additional shared information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support amplitude mirroring detection using additional shared information. For example, the described techniques provide for a first wireless device (e.g., a transmitting device) generating an orthogonal frequency division multiplexing (OFDM) waveform and transmitting the waveform to a second wireless device (e.g., a receiving device). The first wireless device or the second wireless device may indicate support for crest factor reduction (CFR) techniques using waveform clipping and mirroring. Based on the CFR techniques being supported, the first wireless device may indicate parameters associated with a CFR function, such as a clipping level and a mirroring level. The first wireless device may generate a waveform based on the CFR function and the indicated parameters. For example, the first wireless device may clip a portion of the waveform with an amplitude above the clipping level to the clipping level, or the first wireless device may reduce an amplitude of a portion of the waveform that is above the mirroring level, effectively mirroring the high amplitude portions of the waveform around the mirroring level. The first wireless device may transmit the waveform to the second wireless device after applying the CFR function. The second wireless device may monitor for the waveform and detect one or more mirrored portions of the waveform. For example, the second wireless device may detect the one or more mirrored portions of the waveform based on one or more points of interest (POIs), the signal clipping level, one or more parameters, or any combination thereof. The second wireless device may invert the one or more mirrored portions of the waveform over the mirroring level to restore and decode the waveform.

A method for wireless communications by a first wireless device is described. The method may include communicating, with a second wireless device, control signaling including an indication that a CFR function is supported for waveform generation, transmitting, to the second wireless device, a control message indicating a signal clipping level and a signal amplitude mirroring level associated with the CFR function, and transmitting, to the second wireless device, a waveform including a message, the waveform based on the CFR function, the signal clipping level, and the signal amplitude mirroring level.

A first wireless device for wireless communications is described. The first wireless device may include one or more memories storing processor executable code, and one or more processors coupled with the one or more memories. The one or more processors may individually or collectively operable to execute the code to cause the first wireless device to communicate, with a second wireless device, control signaling including an indication that a CFR function is supported for waveform generation, transmit, to the second wireless device, a control message indicating a signal clipping level and a signal amplitude mirroring level associated with the CFR function, and transmit, to the second wireless device, a waveform including a message, the waveform based on the CFR function, the signal clipping level, and the signal amplitude mirroring level.

Another first wireless device for wireless communications is described. The first wireless device may include means for communicating, with a second wireless device, control signaling including an indication that a CFR function is supported for waveform generation, means for transmitting, to the second wireless device, a control message indicating a signal clipping level and a signal amplitude mirroring level associated with the CFR function, and means for transmitting, to the second wireless device, a waveform including a message, the waveform based on the CFR function, the signal clipping level, and the signal amplitude mirroring level.

A non-transitory computer-readable medium storing code for wireless communications is described. The code may include instructions executable by a processor to communicate, with a second wireless device, control signaling including an indication that a CFR function is supported for waveform generation, transmit, to the second wireless device, a control message indicating a signal clipping level and a signal amplitude mirroring level associated with the CFR function, and transmit, to the second wireless device, a waveform including a message, the waveform based on the CFR function, the signal clipping level, and the signal amplitude mirroring level.

Some examples of the method, first wireless devices, and non-transitory computer-readable medium described herein may further include operations, features, means, or instructions for transmitting, based on the indication that the CFR function may be supported for waveform generation, an indication of an activation of the CFR function.

Some examples of the method, first wireless devices, and non-transitory computer-readable medium described herein may further include operations, features, means, or instructions for transmitting, based on the indication that the CFR function may be supported for waveform generation, an indication of a deactivation of the CFR function.

In some examples of the method, first wireless devices, and non-transitory computer-readable medium described herein, the control message indicates a minimum threshold time duration between a beginning of an amplitude mirroring instance and an ending of the amplitude mirroring instance, a maximum threshold time duration between the beginning of the amplitude mirroring instance and the ending of the amplitude mirroring instance, or both.

Some examples of the method, first wireless devices, and non-transitory computer-readable medium described herein may further include operations, features, means, or instructions for generating an original waveform having an original amplitude, reducing a peak portion of the original amplitude that may be above the signal clipping level to the signal clipping level to obtain a clipped amplitude, and reducing a peak portion of the clipped amplitude that may be above the signal amplitude mirroring level to a reduced peak amplitude based on a difference between the peak portion and the signal amplitude mirroring level, where the waveform includes the reduced peak amplitude.

Some examples of the method, first wireless devices, and non-transitory computer-readable medium described herein may further include operations, features, means, or instructions for receiving a grant scheduling transmission of the message within a resource used to transmit the waveform, where the first wireless device may be a UE, and the second wireless device may be a network entity.

Some examples of the method, first wireless devices, and non-transitory computer-readable medium described herein may further include operations, features, means, or instructions for transmitting a grant scheduling transmission of the message within a resource used to transmit the waveform, where the first wireless device may be a network entity, and the second wireless device may be a UE.

In some examples of the method, first wireless devices, and non-transitory computer-readable medium described herein, communicating the control signaling may include operations, features, means, or instructions for transmitting a RRC message including the indication that the CFR function may be supported.

In some examples of the method, first wireless devices, and non-transitory computer-readable medium described herein, transmitting the control message may include operations, features, means, or instructions for transmitting an uplink control message or a downlink control message indicating the signal clipping level and the signal amplitude mirroring level associated with the CFR function.

A method for wireless communications by a second wireless device is described. The method may include communicating, with a first wireless device, control signaling including an indication that a CFR function is supported for waveform generation, receiving, from the second wireless device, a control message indicating a signal clipping level and a signal amplitude mirroring level associated with the CFR function, and receiving, from the second wireless device, a waveform including a message, where the control message further indicates that the waveform is in accordance with the signal clipping level and the signal amplitude mirroring level associated with the CFR function.

A second wireless device for wireless communications is described. The second wireless device may include one or more memories storing processor executable code, and one or more processors coupled with the one or more memories. The one or more processors may individually or collectively operable to execute the code to cause the second wireless device to communicate, with a first wireless device, control signaling including an indication that a CFR function is supported for waveform generation, receive, from the second wireless device, a control message indicating a signal clipping level and a signal amplitude mirroring level associated with the CFR function, and receive, from the second wireless device, a waveform including a message, where the control message further indicates that the waveform is in accordance with the signal clipping level and the signal amplitude mirroring level associated with the CFR function.

Another second wireless device for wireless communications is described. The second wireless device may include means for communicating, with a first wireless device, control signaling including an indication that a CFR function is supported for waveform generation, means for receiving, from the second wireless device, a control message indicating a signal clipping level and a signal amplitude mirroring level associated with the CFR function, and means for receiving, from the second wireless device, a waveform including a message, where the control message further indicates that the waveform is in accordance with the signal clipping level and the signal amplitude mirroring level associated with the CFR function.

A non-transitory computer-readable medium storing code for wireless communications is described. The code may include instructions executable by a processor to communicate, with a first wireless device, control signaling including an indication that a CFR function is supported for waveform generation, receive, from the second wireless device, a control message indicating a signal clipping level and a signal amplitude mirroring level associated with the CFR function, and receive, from the second wireless device, a waveform including a message, where the control message further indicates that the waveform is in accordance with the signal clipping level and the signal amplitude mirroring level associated with the CFR function.

Some examples of the method, second wireless devices, and non-transitory computer-readable medium described herein may further include operations, features, means, or instructions for receiving, based on the indication that the CFR function may be supported for waveform generation, an indication of an activation of the CFR function, where receiving the waveform may be based on the indication of the activation of the CFR function.

Some examples of the method, second wireless devices, and non-transitory computer-readable medium described herein may further include operations, features, means, or instructions for receiving, based on the indication that the CFR function may be supported for waveform generation, an indication of a deactivation of the CFR function.

In some examples of the method, second wireless devices, and non-transitory computer-readable medium described herein, the control message indicates a minimum threshold time duration between a beginning of an amplitude mirroring instance and an ending of the amplitude mirroring instance, a maximum threshold time duration between the beginning of the amplitude mirroring instance and the ending of the amplitude mirroring instance, or both.

Some examples of the method, second wireless devices, and non-transitory computer-readable medium described herein may further include operations, features, means, or instructions for increasing an amplitude of a mirrored portion of the waveform based on a difference between the amplitude of the mirrored portion and the signal amplitude mirroring level.

Some examples of the method, second wireless devices, and non-transitory computer-readable medium described herein may further include operations, features, means, or instructions for receiving a grant scheduling transmission of the message within a resource used to transmit the waveform, where the second wireless device may be a UE, and the first wireless device may be a network entity.

Some examples of the method, second wireless devices, and non-transitory computer-readable medium described herein may further include operations, features, means, or instructions for transmitting a grant scheduling transmission of the message within a resource used to transmit the waveform, where the second wireless device may be a network entity, and the first wireless device may be a UE.

In some examples of the method, second wireless devices, and non-transitory computer-readable medium described herein, communicating the control signaling may include operations, features, means, or instructions for receiving a RRC message including the indication that the CFR function may be supported.

In some examples of the method, second wireless devices, and non-transitory computer-readable medium described herein, receiving the control message may include operations, features, means, or instructions for receiving an uplink control message or a downlink control message indicating the signal clipping level and the signal amplitude mirroring level associated with the CFR function.

DETAILED DESCRIPTION

Figure 1:
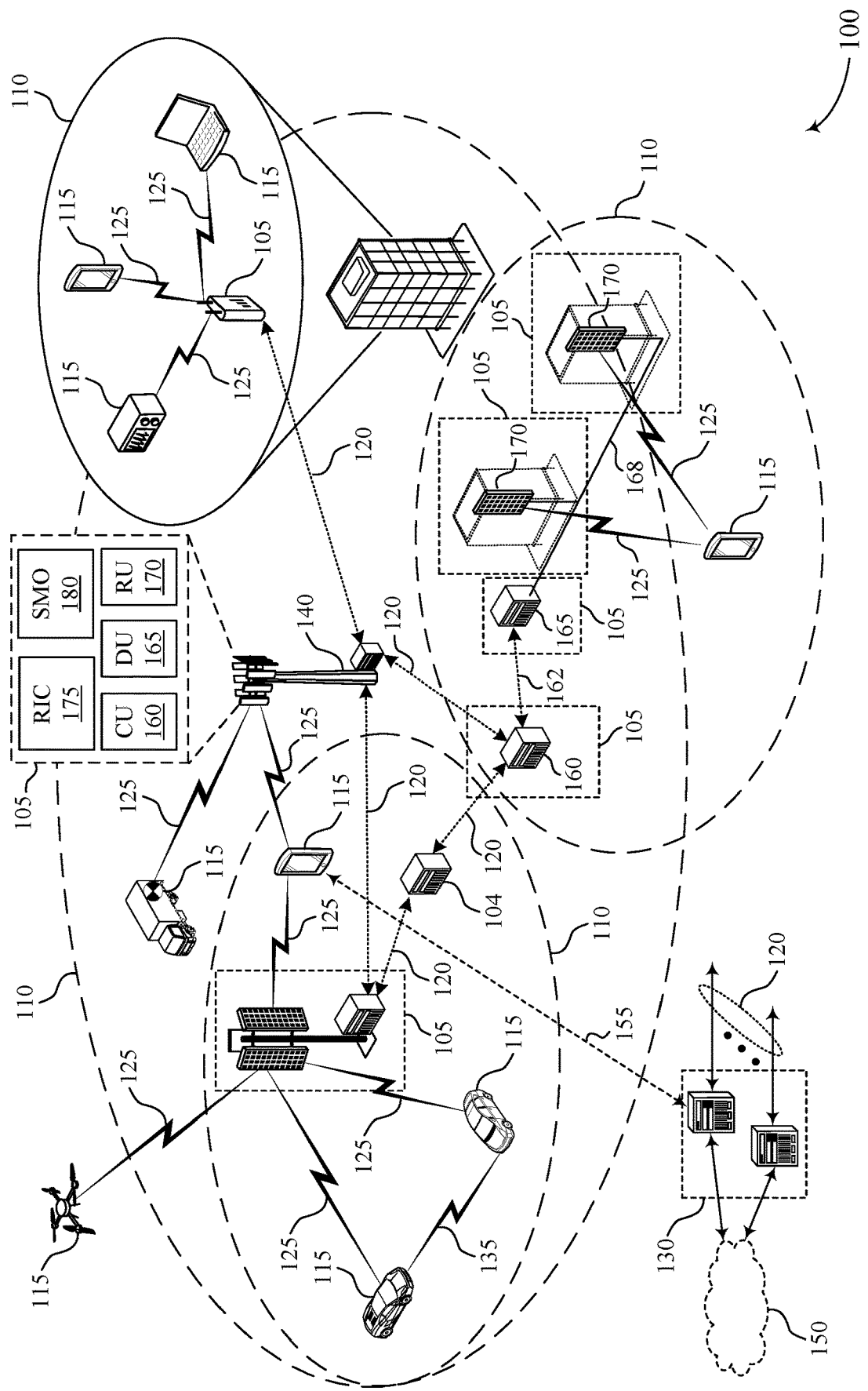
FIG. 1 shows an example of a wireless communications system that supports amplitude mirroring detection using additional shared information in accordance with one or more aspects of the present disclosure.

In some wireless communications systems, wireless devices (e.g., a user equipment (UE), a network entity) may transmit and receive signals using orthogonal frequency division multiplexing (OFDM). OFDM symbols may have a high peak-to-average power ratio (PAPR), which may by associated with non-linear distortion in a power amplifier (PA) and a reduction in overall signal quality. To improve signal quality, the wireless devices may implement techniques to reduce PAPR. In some examples, a transmitting device may perform a signal clipping operation, which may include clipping the signal above a threshold amplitude and filtering the signal. In such examples, a receiving device may only restore the waveform up to statistical error (e.g., may not fully reverse the signal clipping operation), which may result in data loss. In some other examples, a transmitting device may perform an amplitude mirroring operation, which may include inverting the portions of the waveform which exceed an amplitude mirroring level. The amplitude mirroring operation may be fully invertible or recoverable by the receiving device but may introduce additional complexity to both the transmitting device and the receiving device. Additionally, the amplitude mirroring operation may be prone to false detections of mirrored portions based on a double-peak pattern of multiple mirrored portions. In such examples, if the receiving device attempts to invert the falsely detected mirrored portion, the receiving device may recover an OFDM symbol with high distortion.

Aspects of the present disclosure are related to amplitude mirroring detection using additional shared information. A transmitting device and a receiving device may indicate support for crest factor reduction (CFR) techniques using clipping and mirroring. In some examples, the transmitting device may indicate if a CFR function is applied for a transmission, such as by enabling or disabling the CFR techniques. In some examples, the transmitting device may indicate parameters for the CFR function, such as a signal clipping level and an amplitude mirroring level for a CFR function used by the transmitting device. The transmitting device may generate an original waveform and clip or mirror high amplitude portions of the original waveform in accordance with the CFR function. The transmitting device may transmit a signal with the clipped and mirrored waveform to the receiving device. The receiving device may monitor for the waveform and detect one or more points of interest (POIs) associated with the amplitude mirroring level. In some examples, the receiving device may detect the POIs associated with the amplitude mirroring level when the transmitter indicates that the CFR function or amplitude mirroring is enabled or activated. Based on detecting the POIs, the receiving device may detect one or more mirrored portions of the waveform. For example, the receiving device may detect the one or more mirrored portions of the waveform based on the one or more POIs associated with the amplitude mirroring level, the signal clipping level, a minimum threshold duration of time between POIs, a maximum threshold duration of time between POIs, or any combination thereof. The receiving device may invert the one or more mirrored portions of the waveform over the amplitude mirroring level to restore a modified (e.g., mirrored) amplitude of the original waveform.

Aspects of the disclosure are initially described in the context of wireless communications systems. Aspects of the disclosure are additionally illustrated with reference to waveform diagrams and process flows. Aspects of the disclosure are further illustrated by and described with reference to apparatus diagrams, system diagrams, and flowcharts that relate to amplitude mirroring detection using additional shared information.

FIG. 1 shows an example of a wireless communications system 100 that supports amplitude mirroring detection using additional shared information in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support amplitude mirroring detection using additional shared information as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

A transmitting device (e.g., a UE 115, a network entity 105) and a receiving device (e.g., a network entity 105, a UE 115) may communicate capability information associated with supporting CFR techniques using clipping and mirroring. In some examples, the transmitting device may indicate when the CFR technique is applied, enabled, or disabled. The transmitting device may indicate a signal clipping level and an amplitude mirroring level for a CFR function used by the transmitting device. The transmitting device may generate a waveform including a message in accordance with the CFR function (e.g., a clipped and mirrored waveform) and may transmit the waveform to the receiving device. The receiving device may monitor the waveform for one or more POIs associated with the amplitude mirroring level, such as when the transmitter indicates that the CFR function is enabled or activated, to detect one or more mirrored portions of the waveform. For example, the receiving device may detect the one or more mirrored portions of the waveform based on the one or more POIs associated with the amplitude mirroring level, the signal clipping level, a minimum threshold duration of time between POIs, a maximum threshold duration of time between POIs, or any combination thereof. In such examples, based on identifying the one or more mirrored portions of the waveform, the receiving device may invert the one or more mirrored portions of the waveform over the amplitude mirroring level to restore a clipped amplitude of the waveform.

Figure 2:
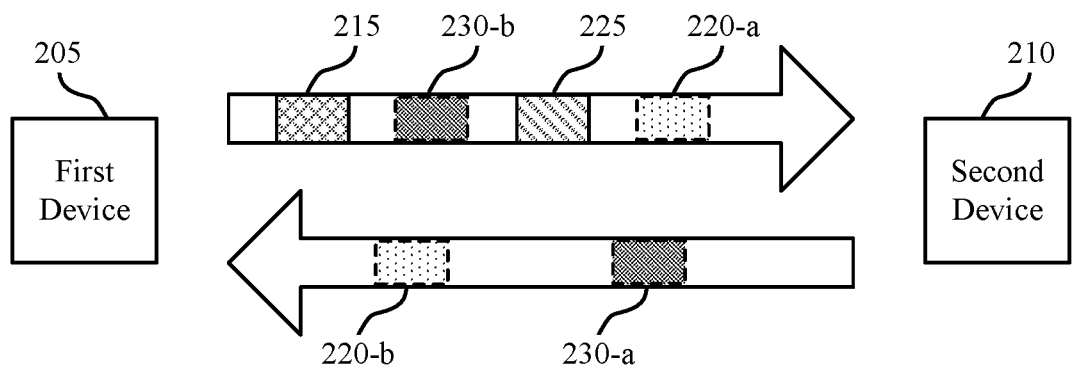
FIG. 2 shows an example of a wireless communications system that supports amplitude mirroring detection using additional shared information in accordance with one or more aspects of the present disclosure.
Figure 2:
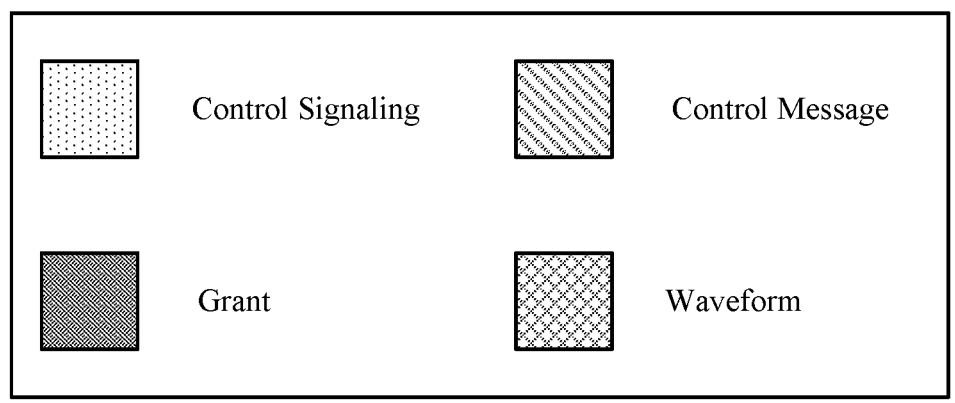

FIG. 2 shows an example of a wireless communications system 200 that supports amplitude mirroring detection using additional shared information in accordance with one or more aspects of the present disclosure. The wireless communications system 200 may include a first device 205 and a second device 210. The first device 205 may be an example of a UE 115 or a network entity 105, which may be examples of corresponding devices as described herein, including with respect to FIG. 1. The second device 210 may be a network entity 105 or a UE 115, which may be examples of corresponding devices as described herein, including with respect to FIG. 1. The first device 205 and the second device 210 may communicate via cellular communication link (e.g., Uu link). In some examples, the first device 205 may be a transmitting device, and the second device 210 may be a receiving device.

In some examples, the first device 205, the second device 210, or both may implement OFDM for communications. In such examples, the first device 205 may transmit a waveform including one or more OFDM symbols. In some wireless communications systems, OFDM symbols may be associated with a high PAPR. Signals with high PAPR may be further associated with non-linear distortion of the signals in a PA of the first device 205, the second device 210, or any combination thereof. Accordingly, the first device 205 and the second device 210 may implement techniques to reduce PAPR.

The wireless communications system 200 may support techniques for CFR, such as using a CFR function. The first device 205 and the second device 210 may implement CFR techniques to reduce the PAPR of signals, such as signals transmitted by the first device 205 and received by the second device 210. In some examples, the CFR technique may include signal clipping or amplitude mirroring, or both. For example, the first device 205 may perform a signal clipping operation, an amplitude mirroring operation, or any combination thereof on waveforms of signals transmitted by the first device 205. In some cases, the first device 205 may perform the amplitude mirroring operation prior to power amplification of the waveform 215. In such cases, the first device 205 may consider non-linear changes made to the waveform in the PA while performing the amplitude mirroring operation.

For example, in accordance with the CFR technique, the first device 205 may generate an original waveform and perform a signal clipping operation on high amplitude portions of the original waveform. Additionally, or alternatively, the first device 205 may perform an amplitude mirroring operation at high amplitude portions of the original waveform or clipped waveform. By performing the clipping operation or the mirroring operation, or both, on the original waveform, the first device 205 may obtain a waveform 215 that is generated, or modified, in accordance with the CFR function. After implementing the CFR technique, the first device 205 may transmit the waveform 215 to the second device 210. The second device 210 may receive the waveform 215 from the first device 205 and, responsive to receiving the waveform 215, may restore the original waveform from the waveform 215. For example, the second device 210 may invert the CFR function, which may include performing an amplitude mirroring reverting operation between one or more POIs of the waveform 215.

The amplitude of the original waveform may be modified so that one or more sections where the original waveform exceeds the amplitude mirroring level is inverted across the amplitude mirroring level. The waveform 215 may experience a sudden decrease in amplitude (e.g., a peak) at a location (e.g., in time) where the clipped amplitude of the waveform 215 exceeds the amplitude mirroring level. The location of sudden change in the amplitude of the waveform 215 may be referred to as a POI. The waveform 215 may be inverted across the amplitude mirroring level at one or more POIs. Pairs of POIs may correspond to mirrored sections of the waveform 215. For example, a mirrored section may have a beginning POI and an end POI. Accordingly, a POI may correspond to a location of a mirroring event (e.g., the beginning of a mirroring event or the end of a mirroring event).

In some examples, the first device 205 and the second device 210 may communicate signaling which indicates that the first device 205 and the second device 210 support the CFR techniques. For example, the first device 205 may transmit control signaling 220-a to the second device 210 indicating a capability of the first device 205 to support the CFR technique. Additionally, or alternatively, the second device 210 may transmit control signaling 220-b to the first device 205 indicating a capability of the second device 210 to support the CFR technique. In some cases, the first device 205, the second device 210, or any combination thereof may transmit the indication via radio resource control (RRC) signaling. In some examples, the first device 205 and the second device 210 may communicate signaling indicating a capability to support the CFR techniques during an initial access procedure or a random access channel procedure, or both.

In some examples, the first device 205 may indicate whether the first device 205 is applying a CFR function for signaling or is about to apply the CFR function for signaling. If the first device 205 indicates whether the CFR function is being applied, the second device 210 may be able to more reliably detect mirrored portions of the waveform 215. Additionally, the second device 210 may refrain from attempting to detect mirrored portions of a waveform that was not based on, generated using, or modified by, the CFR function. For example, the first device 205 may indicate that the first device 205 is applying the CFR function to signals transmitted by the first device 205. In some examples, the first device 205 may indicate that the first device 205 has begun to perform amplitude mirroring on signals. In some examples, the first device 205 may indicate that the CFR technique is no longer being applied. In some cases, the first device 205 may indicate a time duration or a window where the first device 205 is to apply the CFR function. Additionally, or alternatively, the first device 205 may indicate a quantity of subsequent transmissions where the CFR function is applied.

The second device 210 may process signals received from the first device 205 based on the indication of whether the CFR function is being applied or not. For example, if the first device 205 indicates that the CFR function is not being applied, the second device 210 may not search the signals for waveform patterns (e.g., unique mirroring patterns) associated with the CFR technique, which may save power.

In some cases, the first device may transmit a control message 225 indicating whether the CFR function or CFR technique is being applied.

In some examples, the first device 205 may indicate one or more parameters associated with a CFR function or the CFR technique. In some examples, the control message 225 may include the one or more parameters associated with a CFR function or the CFR technique. For example, the control message 225 may indicate a signal clipping level associated with the CFR function or an amplitude mirroring level associated with the CFR function, or both. In some examples, the amplitude mirroring level may be lower than the signal clipping level to further reduce the PAPR of the waveform 215.

In some examples, a UE 115 and a network entity 105 may support different amplitude mirroring levels. For example, a UE 115 may support a first range (e.g., linear range) of amplitude mirroring levels based on a power amplifier of the UE 115, and a network entity 105 may support a second range of amplitude mirroring levels larger than the first range of amplitude mirroring levels based on a power amplifier of the network entity 105. In some cases (e.g., where the first device 205 is a UE), the first device 205 may transmit the indication via an uplink control message. In some other cases (e.g., where the first device 205 is a network entity), the first device 205 may transmit the indication via a downlink control message. The indication (e.g., a signal) may state one or more mirroring levels being used. In some examples, the UE 115 and the network entity 105 can mirror their waveforms with respect to different levels, thus considering that the network entity 105 may have a better power amplifier than the UE 115, allowing larger linear range for the network entity 105.

Additionally, or alternatively, the one or more parameters may include a minimum time duration between POIs of a mirrored section. For example, the one or more parameters may include a minimum time duration between a beginning POI and an end POI of a mirrored portion of the waveform 215. In some examples, the one or more parameters may include a maximum time duration between a beginning POI and an end POI. In some examples, the minimum time duration and the maximum time duration may be a duration in time (e.g., a threshold time duration). A beginning POI may indicate a beginning of an amplitude mirroring instance (e.g., a region of the waveform 215 where amplitude mirroring is applied), and an end POI may indicate an ending of an amplitude mirroring instance. In some implementations, there may be multiple instances of amplitude mirroring within the waveform 215. Accordingly, there may be multiple beginning POIs and end POIs within the waveform 215. Indicating the threshold durations for POIs may enable the second device 210 to correctly identify mirrored sections and avoid inverting falsely detected mirrored sections.

In some examples, the first device 205 may perform the mirroring procedure based on the threshold durations between POIs. For example, configuring a minimum threshold duration for POIs may reduce a likelihood of the first device 205 mirroring a section of the waveform in a low-SNR case where the signal is close to the mirroring threshold, and spontaneous noise causes the waveform to reach closer to the mirroring threshold for a small time interval. Additionally, configuring a maximum threshold duration for POIs may reduce a likelihood of mirroring large sections by accident, causing a large decoding error at the second device 210. Additionally, a signal may be exchanged between the first device 205 and the second device 210 indicating a clipping level with which a match filter may be used (e.g., by the second device 210 when receiving) to detect the mirrored regions.

A network entity 105 may transmit a grant 230 to schedule a UE 115 for wireless communication, such as communication of a signal including the waveform 215. The grant 230 may indicate one or more resources (e.g., uplink resources, downlink resources, sidelink resources, etc.) for communicating the signal carrying the waveform 215. In some examples, the first device 205 may be an example of a UE 115, and the second device 210 may be an example of a network entity 105. In this example, the first device 205 may receive a grant 230-*a* scheduling transmission of the waveform 215. In some other examples, the first device 205 may be an example of a network entity 105, and the second device 210 may be an example of a UE 115. In this example, the first device 205 may transmit the grant 230-*b* to the second device 210. While these techniques are generally described with reference to signaling via a Uu link (e.g., signaling to a UE via an access link), these techniques may similarly be used for sidelink communications between UEs 115 or signaling between network entities 105.

Based on receiving the grant 230-*a* or transmitting the grant 230-*b*, the first device 205 may generate the waveform 215. The first device 205 may generate an original waveform having an original amplitude. In accordance with a CFR function, the first device 205 may perform the signal clipping operation on the original waveform. For example, the first device 205 may reduce the amplitude of portions of the original waveform that are above the signal clipping level down to the signal clipping level indicated in the control message 225. In some examples, the first device 205 may obtain a clipped waveform after performing the clipping operation.

Additionally, or alternatively, the first device 205 may perform the amplitude mirroring operation to obtain the waveform 215. The waveform 215 may be an example of a waveform which is generated using the CFR function or CFR techniques. For example, the first device 205 may have performed a signal clipping operation For example, the first device 205 may perform the amplitude mirroring according to the amplitude mirroring level indicated in the control message 225. For example, the first device 205 may perform the amplitude mirroring operation between the one or more POIs of the original waveform. The first device 205 may invert portions of the amplitude which exceed the amplitude mirroring level around the amplitude mirroring level, effectively mirroring the original amplitude around the amplitude mirroring level. If the first device 205 performed the signal clipping operation, the first device may perform the amplitude mirroring operation on the clipped waveform. If the first device 205 did not perform the signal clipping operation, the first device may perform the amplitude mirroring operation on the original waveform.

The first device 205 may transmit the waveform 215 to the second device 210 using the resources indicated by the grant 230, and the second device 210 may receive the waveform 215 via the resources. The second device 210 may attempt to restore the original amplitude of the waveform 215 by inverting the CFR function applied by the first device 205.

The second device 210 may use the parameters indicated by the control message 225 to recover the original waveform of the waveform 215. In some examples, the second device 210 may detect one or more mirrored regions of the waveform 215 (e.g., using a match filter). In some examples, the second device 210 may perform an amplitude mirroring reverting operation on the waveform 215, the second device 210 may invert the waveform 215 over the amplitude mirroring level between pairs of POIs that correspond to mirrored sections of the waveform 215. By inverting the mirrored portions of the waveform 215, the second device 210 may recover the original waveform or the clipped waveform. In some examples, the second device 210 may perform filtering to recover the original waveform from the clipped waveform.

Figure 3:
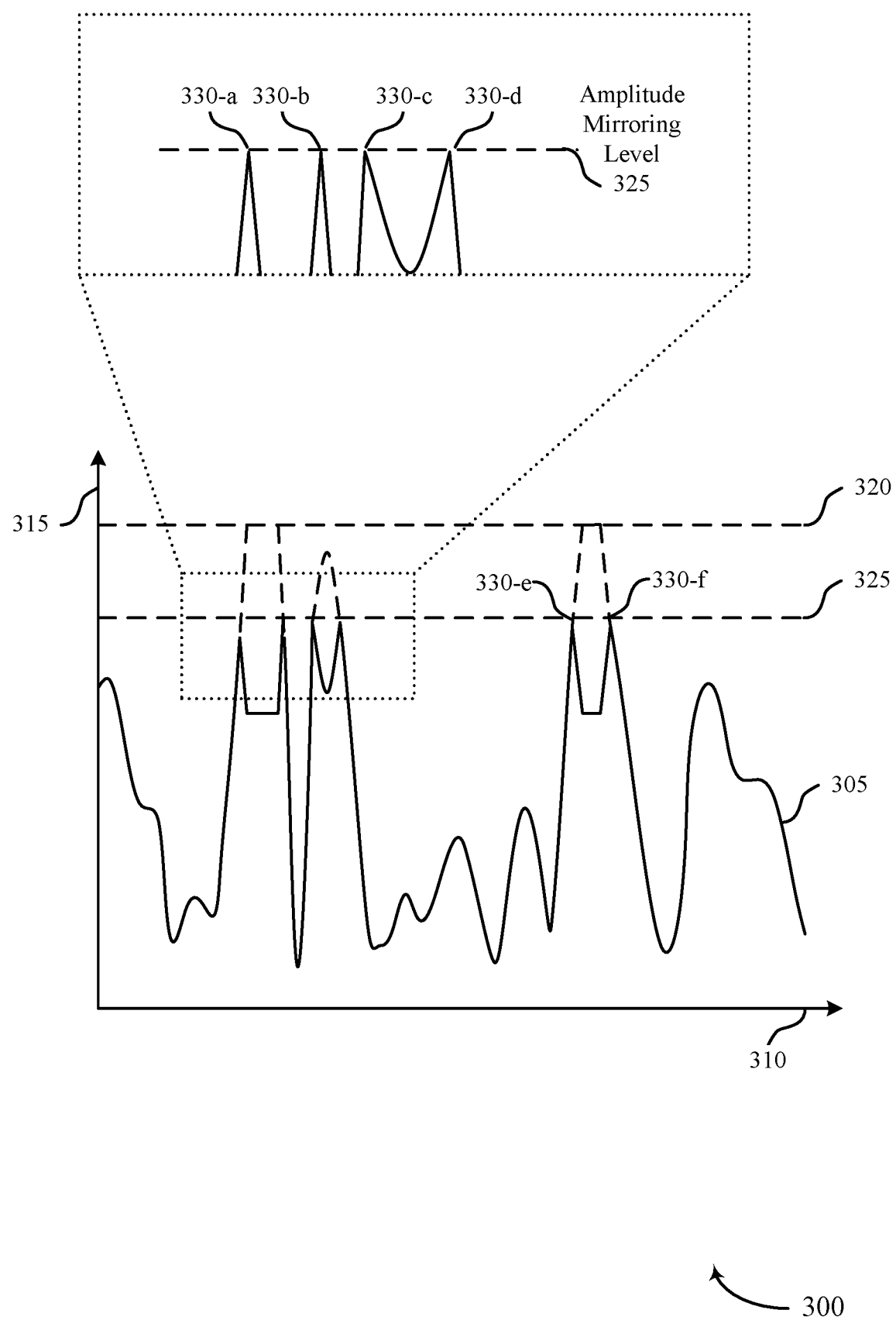
FIG. 3 shows an example of a waveform diagram that supports amplitude mirroring detection using additional shared information in accordance with one or more aspects of the present disclosure.

FIG. 3 shows an example of a waveform diagram 300 that supports amplitude mirroring detection using additional shared information in accordance with one or more aspects of the present disclosure. The waveform diagram 300 may implement aspects of the wireless communications system 100, the wireless communications system 200, or any combination thereof, or may be implemented by aspects of the wireless communications system 100, the wireless communications system 200, or any combination thereof. Transmissions between a first wireless device and a second wireless device (which may be examples of a first device 205 and a second device 210, respectively) may include a waveform 305. The waveform diagram 300 may include a horizontal axis 310 and a vertical axis 315. In some examples, the horizontal axis 310 may represent a time component of the waveform 305, and the vertical axis 315 may represent an amplitude component of the waveform 305. In such examples, the first wireless device (e.g., a transmitting device) may transmit the waveform 305 in accordance with a CFR technique, which may include a signal clipping operation or an amplitude mirroring operation, or both.

In some examples, the first wireless device may perform a clipping operation to clip high amplitude portions of the waveform 305. For example, the waveform 305 may include one or more sections where the original amplitude of the waveform 305 is greater than the signal clipping level 320. In such examples, the amplitude of the waveform 305 (e.g., an original amplitude) may be restricted to a clipped amplitude so that the clipped amplitude of the waveform 305 does not exceed the signal clipping level 320. For example, the first wireless device may set, or clip, the amplitude of the waveform 305 to the signal clipping level 320 where the original amplitude of the waveform 305 exceeds the signal clipping level 320.

In some examples, the waveform 305 may be mirrored or inverted across an amplitude mirroring level 325. In some examples, the amplitude mirroring level 325 may be an example of or referred to as a signal amplitude mirroring level. For example, the waveform 305 may include one or more sections where the original amplitude of the waveform 305 is greater than or exceeds the amplitude mirroring level 325. In such examples, the amplitude of the waveform 305 may be modified to a reduced peak amplitude so that the reduced peak amplitude of the waveform 305 does not exceed the amplitude mirroring level 325 and instead is inverted around the amplitude mirroring level 325. For example, if the original waveform has an amplitude that is X dB above the amplitude mirroring level, the amplitude mirroring procedure may generate a waveform that has an amplitude that is X dB below the amplitude mirroring level. In some examples, the amplitude mirroring level 325 may be lower than the signal clipping level 320 to further reduce the PAPR of the waveform 305. For example, the waveform 305 may be clipped at 7 dB and mirrored at 5.5 dB.

The amplitude of the waveform 305 may be modified so that the one or more sections where the waveform 305 exceeds the amplitude mirroring level is inverted across the amplitude mirroring level 325. In accordance with the amplitude mirroring operation, the waveform 305 may experience a sudden decrease in amplitude (e.g., a peak) at a location (e.g., in time) where the clipped amplitude of the waveform 305 may exceed the amplitude mirroring level 325. The location of sudden change in the amplitude of the waveform 305 may be represented as a POI 330. The waveform 305 may be inverted across the amplitude mirroring level 325 at one or more POIs 330 (including a first POI 330-a, a second POI 330-b, a third POI 330-c, a fourth POI 330-d, a fifth POI 330-e, and a sixth POI 330-f). Pairs of POIs 330 may correspond to mirrored sections of the waveform 305. For example, the first POI 330-a and the second POI 330-b may be a pair of POIs 330 that correspond to a first mirrored section, where the first POI 330-a is a beginning POI of the first mirrored section, and the second POI 330-b is an end POI of the first mirrored section. Accordingly, the location of a POI 330 may represent a location of a mirroring event (e.g., the beginning of a mirroring event, the end of a mirroring event).

In some examples, the first wireless device may perform both a clipping procedure and an amplitude mirroring procedure. For example, the first wireless device may clip the original amplitude between the first POI 330-a and the second POI 330-b to the signal clipping level 320, generating a clipped amplitude. The first wireless device may then mirror the clipped amplitude between the first POI 330-a and the second POI 330-b around the amplitude mirroring level 325.

In some other examples, the first wireless device may only perform an amplitude mirroring procedure for a high amplitude portion of the original waveform. For example, a portion of the original waveform between the third POI 330-c and the fourth POI 330-d may be higher than the amplitude mirroring level 325 but may not exceed the signal clipping level 320. The first wireless device may mirror this portion of the original waveform around the amplitude mirroring level 325 but may not clip the waveform at this portion.

The second wireless device (e.g., a receiving device) may receive the waveform 305 and may perform an amplitude mirroring reverting operation to restore the reduced peak amplitude of the waveform 305 to the clipped amplitude. In accordance with the amplitude mirroring reverting operation, the receiving device may detect the one or more mirroring events associated with the waveform 305 based on identifying one or more patterns associated with the waveform 305. For example, the receiving device may identify one or more POIs 330 based on matching the shape (e.g., peak) of the waveform 305 at the one or more POIs 330 (e.g., using a match filter). The receiving device may further identify one or more double-peak patterns associated with two POIs 330. For example, the receiving device may determine that the first POI 330-a represents a first peak of the double-peak pattern (e.g., a first location of a mirroring event) and the second POI 330-b represents a second peak of the double-peak pattern (e.g., a second location of a mirroring event). Accordingly, the receiving device may determine that a section of the waveform 305 between the first POI 330-a and the second POI 330-b is associated with a first mirroring event. Similarly, the receiving device may identify a second mirroring event associated with the third POI 330-c and the fourth POI 330-d and a third mirroring event associated with the fifth POI 330-e and the sixth POI 330-f.

In some examples, the receiving device may detect the one or more mirroring events associated with the waveform 305 based on one or more additional parameters indicated to the receiving device via control messaging. For example, the first wireless device may indicate the signal clipping level 320 or the amplitude mirroring level 325, or both, to the second wireless device. In some examples, the receiving device may detect the one or more mirroring events based on the amplitude mirroring level 325. For example, the receiving device may determine that a drop in the amplitude of the waveform 305 between two POIs 330 (e.g., the first POI 330-a and the second POI 330-b) occurs when the waveform reaches the amplitude mirroring level 325.

In some examples, the second wireless device may detect mirrored portions of the waveform 305 based on the signal clipping level 320. For example, the waveform 305 may flatten at a known amplitude difference between the signal clipping level and the amplitude mirroring level 325. For example, the difference between the signal clipping level 320 and the amplitude mirroring level 325 may be Y dB, and if the waveform 305 stays at an amplitude of the amplitude mirroring level 325 minus Y dB (e.g., for a threshold duration of time), the second wireless device may determine that the waveform 305 has been clipped and mirrored at that portion. Based on the finite amplitude drop, Y, and the location of the POIs 330, the receiving device may determine that a section of the waveform 305 between the first POI 330-a and the second POI 330-b is a mirroring event. In some examples, the second wireless device may use a match filter to detect the mirrored regions using the clipping level. In such examples, the double-peak pattern associated with the finite amplitude drop may be easier to detect by the receiving device (e.g., more coherent pattern). In some examples, detection of a mirroring event may be done in the time domain, via a match filter, matching the unique shape caused at the POI, as well as the region between two adjacent POIs, taking advantage of the known clipping level and the mirrored shape of this clipped signal between two POIs.

Additionally, or alternatively, the receiving device may detect the one or more mirroring events based on a minimum threshold time duration (e.g., threshold time duration) between two POIs 330, a maximum time duration between two POIs 330, or both. In some examples, the receiving device may determine that a section of the waveform 305 is a mirroring event based on the section satisfying both threshold time durations. For example, the receiving device may determine that a time duration between the first POI 330-a and the second POI 330-b satisfies (e.g., is greater than) the minimum threshold time duration and satisfies (e.g., is less than) the maximum threshold time duration. Accordingly, the receiving device may perform an amplitude mirroring reverting operation on the one or more sections of the waveform 305 associated with the one or more mirroring events. In accordance with the amplitude mirroring reverting operation, the receiving device may increase the amplitude of the one or more sections of the waveform 305 by inverting the waveform 305 over the amplitude mirroring level 325.

Similarly, the receiving device may determine that a section of the waveform 305 is not a mirroring event based on the selection failing to satisfy one or more threshold time durations. For example, the receiving device may determine that a section of the waveform 305 between the second POI 330-b and the third POI 330-c fails to satisfy (e.g., is less than) the minimum threshold time duration. Additionally, or alternatively, the receiving device may determine that a section of the waveform 305 between the fourth POI 330-d and the fifth POI 330-e fails to satisfy (e.g., is greater than) the maximum threshold time duration. Accordingly, the receiving device may not perform an amplitude mirroring reverting operation on the one or more sections of the waveform 305 that fail to satisfy the one or more parameters, which may reduce decoding error.

Figure 4:
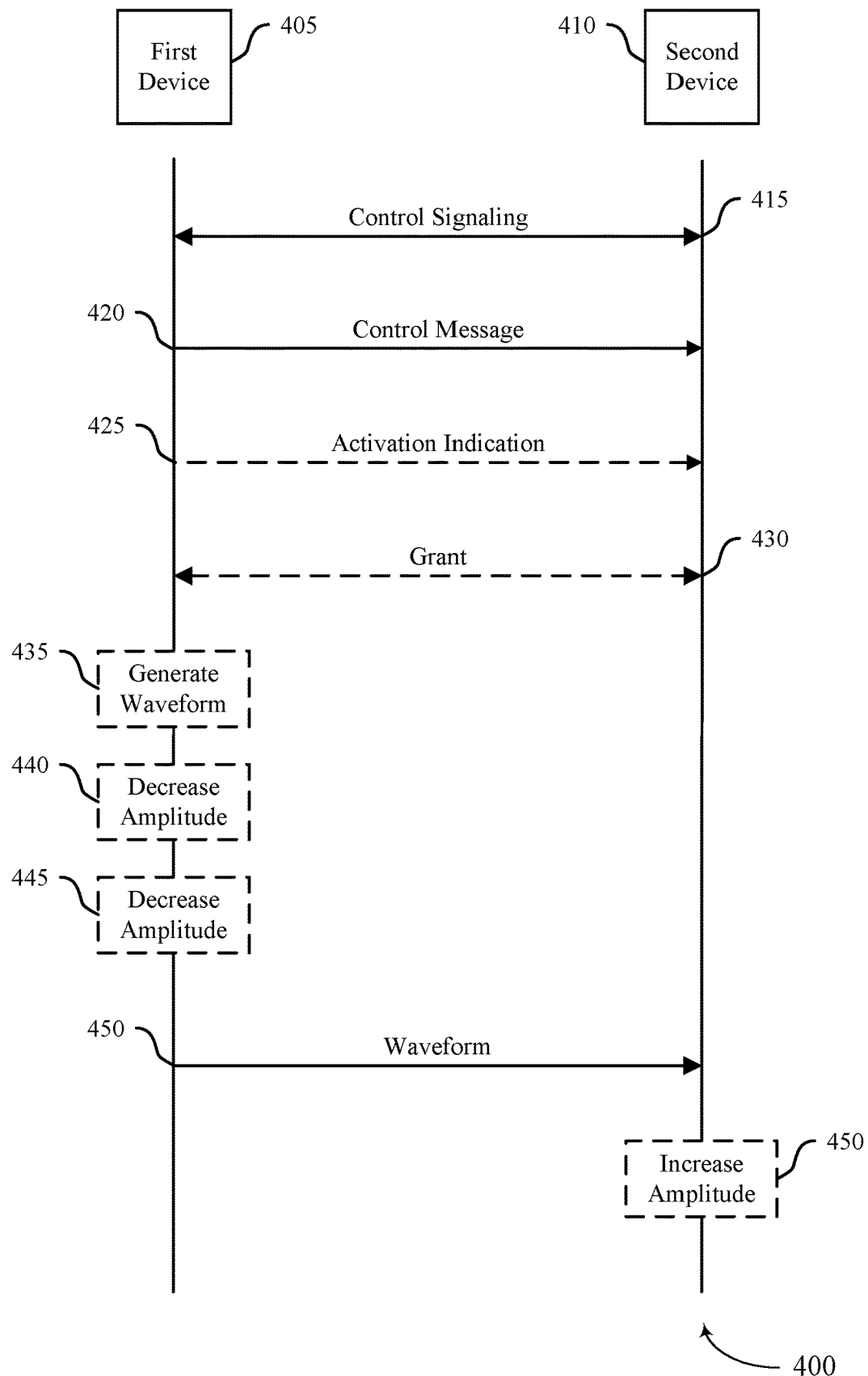
FIG. 4 shows an example of a process flow that supports amplitude mirroring detection using additional shared information in accordance with one or more aspects of the present disclosure.

FIG. 4 shows an example of a process flow 400 that supports amplitude mirroring detection using additional shared information in accordance with one or more aspects of the present disclosure. The process flow 400 may implement or be implemented by aspects of the wireless communications system 100 and the wireless communications system 200 as described with reference to FIGS. 1 and 2. For instance, in the example, of FIG. 4, a first device 405 may be in communication with a second device 410, which may be examples of devices described herein with reference to FIG. 2. The first device 405 may be a UE or a network entity, which may be examples of a UE 115 or a network entity 105 as described with reference to FIG. 1. The second device 410 may be a network entity or a UE, which may be examples of a network entity 105 or a UE 115 as described with reference to FIG. 1. In the following description of the process flow 400, the operations between the first device 405 and the second device 410 may be performed in a different order than the example shown, or the operations between the first device 405 and the second device 410 may be performed in different orders at different times. Some operations may also be omitted form the process flow 400, and other operations may be added to the process flow 400.

At 415, the first device 405 and the second device 410 may communicate signaling indicating support for using a CFR function for waveform generation. For example, at 415 the first device 405 may transmit, to the second device 410, control signaling including an indication that a CFR function is supported for waveform generation. In some examples, the first device 405 may transmit a RRC message including the indication that the CFR function is supported. In some examples, the first device 405 may receive, from the second device 410, control signaling including an indication that the CFR function is supported for waveform generation. In some examples, the second device 410 may transmit the RRC message including the indication that the CFR function is supported.

At 420, the first device 405 may transmit, to the second device 410, a control message indicating one or more parameters associated with the CFR function. For example, the control message may indicate a signal clipping level and a signal amplitude mirroring level associated with the CFR function. Additionally, or alternatively, the control message may indicate a minimum threshold time duration between a beginning of an amplitude mirroring instance and an ending of the amplitude mirroring instance, a maximum threshold time duration between the beginning of the amplitude mirroring instance and the ending of the amplitude mirroring instance, or both. For example, the control message may indicate a minimum threshold time duration between a beginning POI and an end POI of a mirroring instance. In some examples, the first device 405 may transmit an uplink control message or a downlink control message indicating the one or more parameters associated with the CFR function.

In some examples, at 425, the first device 405 may transmit an indication that the CFR function is being applied. For example, the first device 405 may transmit, based on the indication that the CFR function is supported for waveform generation, an indication of an activation of the CFR function. For example, the first device 405 may transmit the indication stating that the amplitude mirroring has begun.

In some examples, at 430, the first device 405 may receive a grant scheduling transmission of a message via a resource. In such examples, the first device 405 may be a UE, and the second device 410 may be a network entity. In some other examples, the first device 405 may transmit the grant scheduling transmission of the message via the resource. In such examples, the first device 405 may be a network entity, and the second device 410 may be a UE.

At 435, the first device 405 may generate an original waveform having an original amplitude. The original waveform may have portions with very high amplitude, resulting in a high PAPR. At 440 the first device 405 may reduce a peak portion of the original amplitude of the original waveform that is above the signal clipping level to the signal clipping level to obtain a clipped amplitude. At 445 the second device 410 may reduce a peak portion of the clipped amplitude that is above the signal amplitude mirroring level to a reduced peak amplitude based on a difference between the peak portion and the signal amplitude mirroring level. In some examples, the waveform may include, or have, the reduced peak amplitude.

At 450, the first device 405 may transmit, to the second device 410 (e.g., via the resource), the waveform including the message. The waveform may be based on the CFR function, the signal clipping level, and the signal amplitude mirroring level. The second device 410 may receive the waveform based on the indication of the activation of the CFR function.

At 455, the second device 410 may attempt to recover the original waveform of the waveform or the clipped waveform by inverting the CFR or amplitude mirroring procedure. For example, the second device 410 may increase the amplitude of the mirrored portions of the waveform based on a difference between the amplitude of the mirrored portion and the signal amplitude mirroring level.

In some examples, the first device 405 may transmit an indication of a deactivation of the CFR function. For example, the first device 405 may indicate that amplitude mirroring is no longer being used. The second device 410 may stop looking for unique mirroring patterns and reduce power consumption based on the indication that the first device 405 is no longer using the amplitude mirroring procedure.

Figure 5:
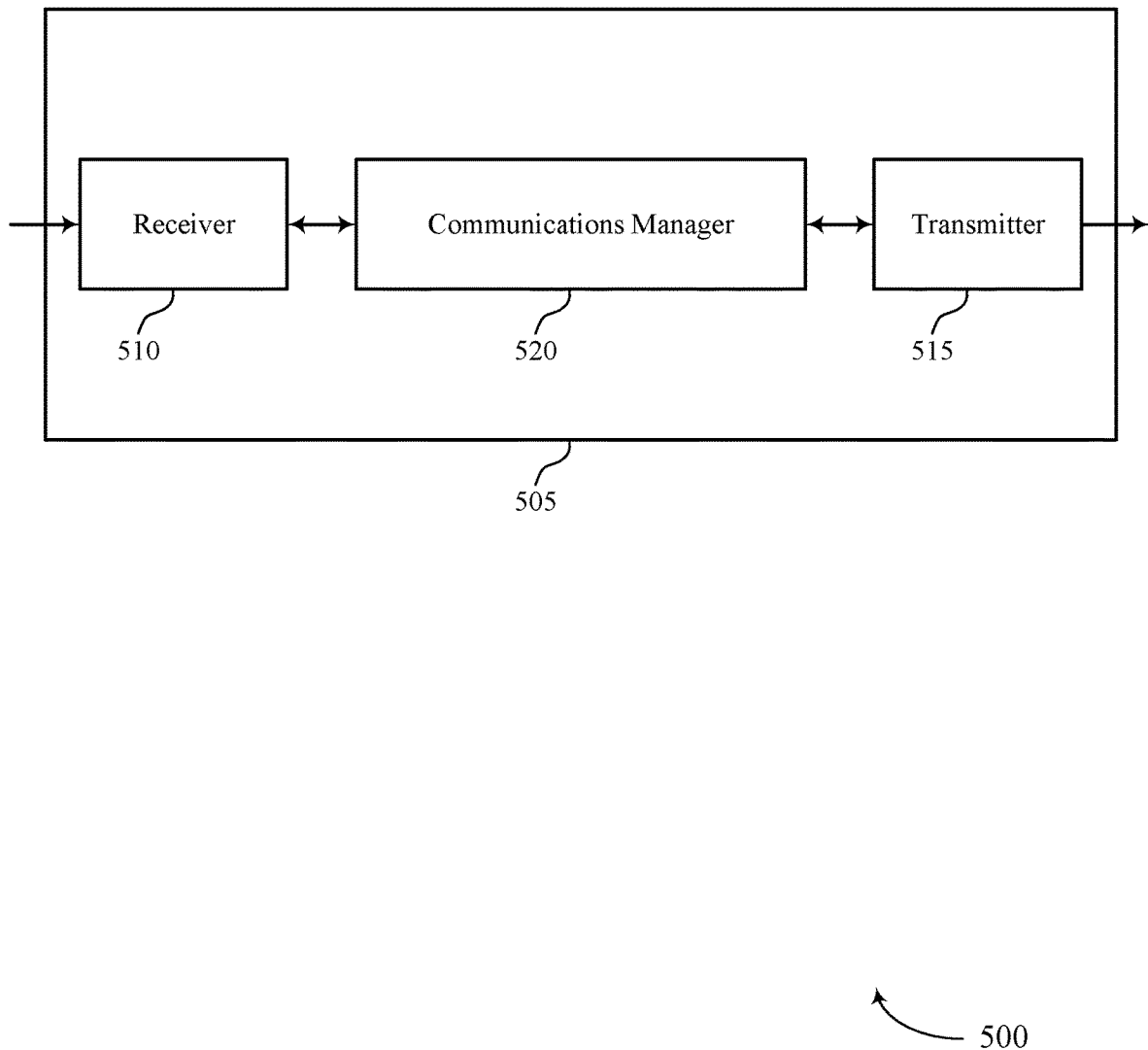
FIGS. 5 and 6 show block diagrams of devices that support amplitude mirroring detection using additional shared information in accordance with one or more aspects of the present disclosure.

FIG. 5 shows a block diagram 500 of a device 505 that supports amplitude mirroring detection using additional shared information in accordance with one or more aspects of the present disclosure. The device 505 may be an example of aspects of a UE 115 or a network entity 105 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to amplitude mirroring detection using additional shared information). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to amplitude mirroring detection using additional shared information). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of amplitude mirroring detection using additional shared information as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first wireless device in accordance with examples as disclosed herein. For example, the communications manager 520 is capable of, configured to, or operable to support a means for communicating, with a second wireless device, control signaling including an indication that a CFR function is supported for waveform generation. The communications manager 520 is capable of, configured to, or operable to support a means for transmitting, to the second wireless device, a control message indicating a signal clipping level and a signal amplitude mirroring level associated with the CFR function. The communications manager 520 is capable of, configured to, or operable to support a means for transmitting, to the second wireless device, a waveform including a message, the waveform based on the CFR function, the signal clipping level, and the signal amplitude mirroring level.

Additionally, or alternatively, the communications manager 520 may support wireless communications at a second wireless device in accordance with examples as disclosed herein. For example, the communications manager 520 is capable of, configured to, or operable to support a means for communicating, with a first wireless device, control signaling including an indication that a CFR function is supported for waveform generation. The communications manager 520 is capable of, configured to, or operable to support a means for receiving, from the second wireless device, a control message indicating a signal clipping level and a signal amplitude mirroring level associated with the CFR function. The communications manager 520 is capable of, configured to, or operable to support a means for receiving, from the second wireless device, a waveform including a message, where the control message further indicates that the waveform is in accordance with the signal clipping level and the signal amplitude mirroring level associated with the CFR function.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for improved signal quality and reduced decoding error rates.

Figure 6:
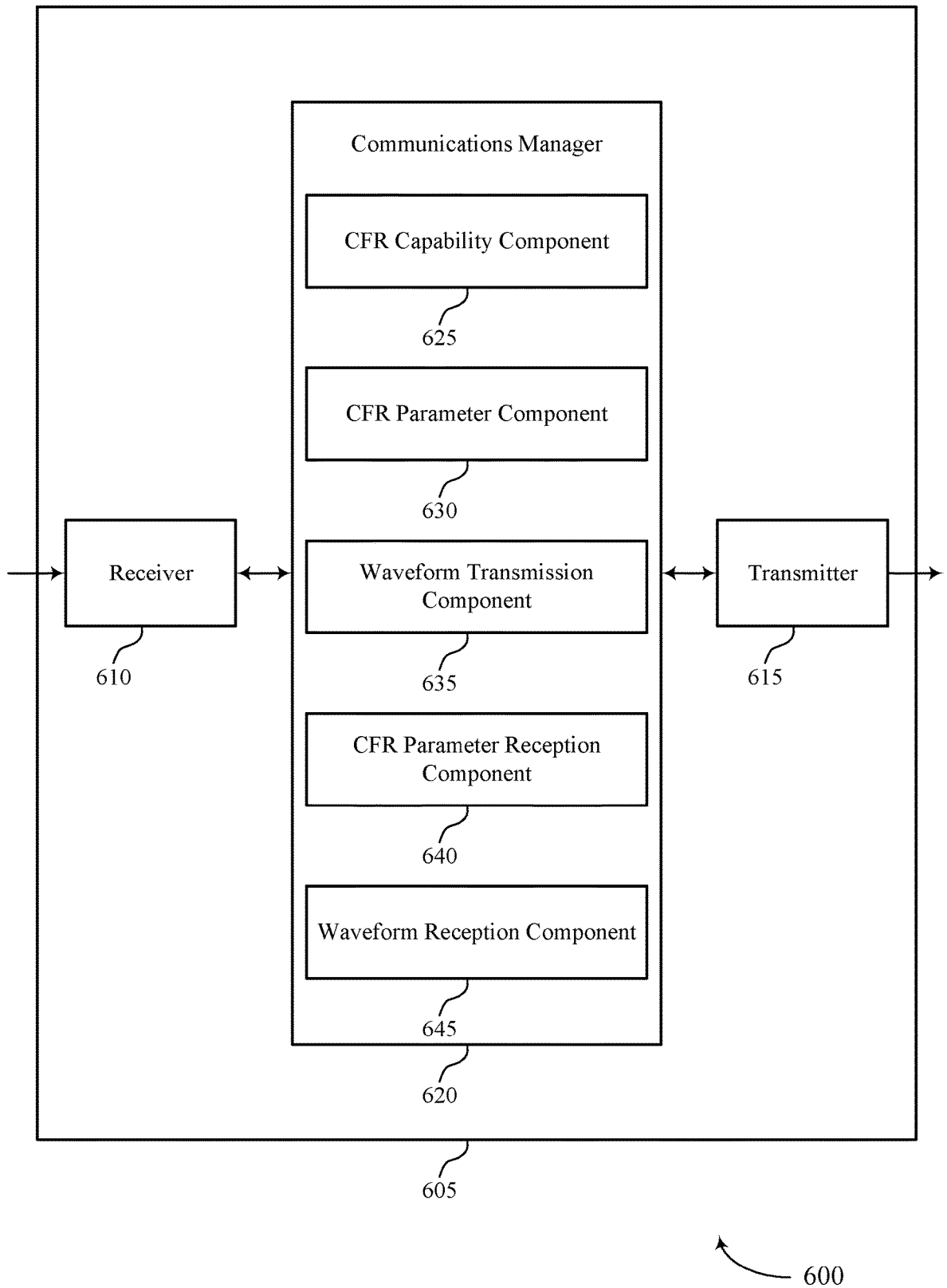

FIG. 6 shows a block diagram 600 of a device 605 that supports amplitude mirroring detection using additional shared information in accordance with one or more aspects of the present disclosure. The device 605 may be an example of aspects of a device 505, a UE 115, or a network entity 105 as described herein. The device 605 may include a receiver 610, a transmitter 615, and a communications manager 620. The device 605, or one of more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to amplitude mirroring detection using additional shared information). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to amplitude mirroring detection using additional shared information). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of amplitude mirroring detection using additional shared information as described herein. For example, the communications manager 620 may include an CFR capability component 625, an CFR parameter component 630, a waveform transmission component 635, an CFR parameter reception component 640, a waveform reception component 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first wireless device in accordance with examples as disclosed herein. The CFR capability component 625 is capable of, configured to, or operable to support a means for communicating, with a second wireless device, control signaling including an indication that a CFR function is supported for waveform generation. The CFR parameter component 630 is capable of, configured to, or operable to support a means for transmitting, to the second wireless device, a control message indicating a signal clipping level and a signal amplitude mirroring level associated with the CFR function. The waveform transmission component 635 is capable of, configured to, or operable to support a means for transmitting, to the second wireless device, a waveform including a message, the waveform based on the CFR function, the signal clipping level, and the signal amplitude mirroring level.

Additionally, or alternatively, the communications manager 620 may support wireless communications at a second wireless device in accordance with examples as disclosed herein. The CFR capability component 625 is capable of, configured to, or operable to support a means for communicating, with a first wireless device, control signaling including an indication that a CFR function is supported for waveform generation. The CFR parameter reception component 640 is capable of, configured to, or operable to support a means for receiving, from the second wireless device, a control message indicating a signal clipping level and a signal amplitude mirroring level associated with the CFR function. The waveform reception component 645 is capable of, configured to, or operable to support a means for receiving, from the second wireless device, a waveform including a message, where the control message further indicates that the waveform is in accordance with the signal clipping level and the signal amplitude mirroring level associated with the CFR function.

Figure 7:
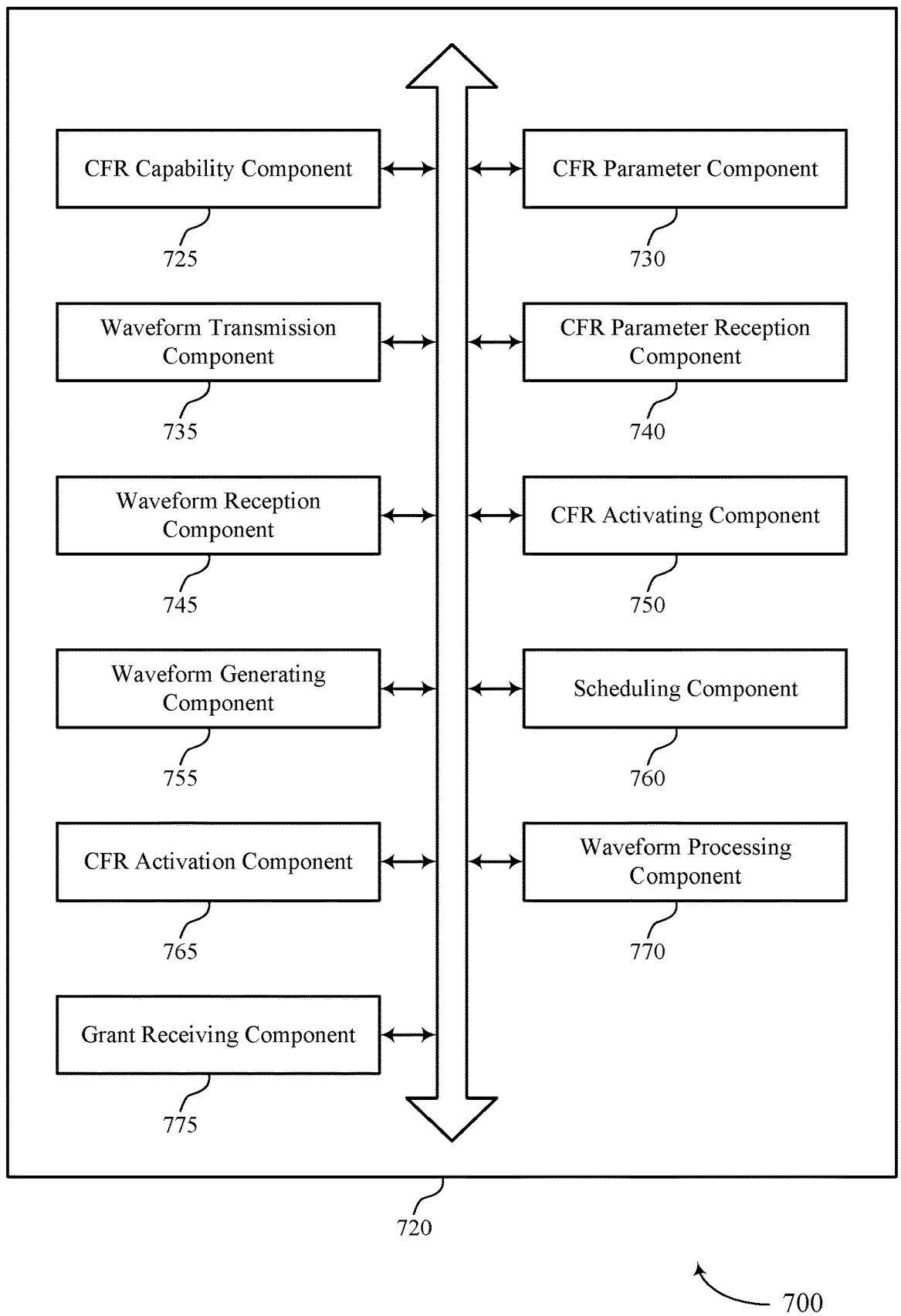
FIG. 7 shows a block diagram of a communications manager that supports amplitude mirroring detection using additional shared information in accordance with one or more aspects of the present disclosure.

FIG. 7 shows a block diagram 700 of a communications manager 720 that supports amplitude mirroring detection using additional shared information in accordance with one or more aspects of the present disclosure. The communications manager 720 may be an example of aspects of a communications manager 520, a communications manager 620, or both, as described herein. The communications manager 720, or various components thereof, may be an example of means for performing various aspects of amplitude mirroring detection using additional shared information as described herein. For example, the communications manager 720 may include an CFR capability component 725, an CFR parameter component 730, a waveform transmission component 735, an CFR parameter reception component 740, a waveform reception component 745, an CFR activating component 750, a waveform generating component 755, a scheduling component 760, an CFR activation component 765, a waveform processing component 770, a grant receiving component 775, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications at a first wireless device in accordance with examples as disclosed herein. The CFR capability component 725 is capable of, configured to, or operable to support a means for communicating, with a second wireless device, control signaling including an indication that a CFR function is supported for waveform generation. The CFR parameter component 730 is capable of, configured to, or operable to support a means for transmitting, to the second wireless device, a control message indicating a signal clipping level and a signal amplitude mirroring level associated with the CFR function. The waveform transmission component 735 is capable of, configured to, or operable to support a means for transmitting, to the second wireless device, a waveform including a message, the waveform based on the CFR function, the signal clipping level, and the signal amplitude mirroring level.

In some examples, the CFR activating component 750 is capable of, configured to, or operable to support a means for transmitting, based on the indication that the CFR function is supported for waveform generation, an indication of an activation of the CFR function.

In some examples, the CFR activating component 750 is capable of, configured to, or operable to support a means for transmitting, based on the indication that the CFR function is supported for waveform generation, an indication of a deactivation of the CFR function.

In some examples, the control message indicates a minimum threshold time duration between a beginning of an amplitude mirroring instance and an ending of the amplitude mirroring instance, a maximum threshold time duration between the beginning of the amplitude mirroring instance and the ending of the amplitude mirroring instance, or both.

In some examples, the waveform generating component 755 is capable of, configured to, or operable to support a means for generating an original waveform having an original amplitude. In some examples, the waveform generating component 755 is capable of, configured to, or operable to support a means for reducing a peak portion of the original amplitude that is above the signal clipping level to the signal clipping level to obtain a clipped amplitude. In some examples, the waveform generating component 755 is capable of, configured to, or operable to support a means for reducing a peak portion of the clipped amplitude that is above the signal amplitude mirroring level to a reduced peak amplitude based on a difference between the peak portion and the signal amplitude mirroring level, where the waveform includes the reduced peak amplitude.

In some examples, the scheduling component 760 is capable of, configured to, or operable to support a means for receiving a grant scheduling transmission of the message within a resource used to transmit the waveform, where the first wireless device is a UE, and the second wireless device is a network entity.

In some examples, the scheduling component 760 is capable of, configured to, or operable to support a means for transmitting a grant scheduling transmission of the message within a resource used to transmit the waveform, where the first wireless device is a network entity, and the second wireless device is a UE.

In some examples, to support communicating the control signaling, the CFR capability component 725 is capable of, configured to, or operable to support a means for transmitting a radio resource control message including the indication that the CFR function is supported.

In some examples, to support transmitting the control message, the CFR parameter component 730 is capable of, configured to, or operable to support a means for transmitting an uplink control message or a downlink control message indicating the signal clipping level and the signal amplitude mirroring level associated with the CFR function.

Additionally, or alternatively, the communications manager 720 may support wireless communications at a second wireless device in accordance with examples as disclosed herein. In some examples, the CFR capability component 725 is capable of, configured to, or operable to support a means for communicating, with a first wireless device, control signaling including an indication that a CFR function is supported for waveform generation. The CFR parameter reception component 740 is capable of, configured to, or operable to support a means for receiving, from the second wireless device, a control message indicating a signal clipping level and a signal amplitude mirroring level associated with the CFR function. The waveform reception component 745 is capable of, configured to, or operable to support a means for receiving, from the second wireless device, a waveform including a message, where the control message further indicates that the waveform is in accordance with the signal clipping level and the signal amplitude mirroring level associated with the CFR function.

In some examples, the CFR activation component 765 is capable of, configured to, or operable to support a means for receiving, based on the indication that the CFR function is supported for waveform generation, an indication of an activation of the CFR function, where receiving the waveform is based on the indication of the activation of the CFR function.

In some examples, the CFR activation component 765 is capable of, configured to, or operable to support a means for receiving, based on the indication that the CFR function is supported for waveform generation, an indication of a deactivation of the CFR function.

In some examples, the control message indicates a minimum threshold time duration between a beginning of an amplitude mirroring instance and an ending of the amplitude mirroring instance, a maximum threshold time duration between the beginning of the amplitude mirroring instance and the ending of the amplitude mirroring instance, or both.

In some examples, the waveform processing component 770 is capable of, configured to, or operable to support a means for increasing an amplitude of a mirrored portion of the waveform based on a difference between the amplitude of the mirrored portion and the signal amplitude mirroring level.

In some examples, the grant receiving component 775 is capable of, configured to, or operable to support a means for receiving a grant scheduling transmission of the message within a resource used to transmit the waveform, where the second wireless device is a UE, and the first wireless device is a network entity.

In some examples, the grant receiving component 775 is capable of, configured to, or operable to support a means for transmitting a grant scheduling transmission of the message within a resource used to transmit the waveform, where the second wireless device is a network entity, and the first wireless device is a UE.

In some examples, to support communicating the control signaling, the CFR parameter reception component 740 is capable of, configured to, or operable to support a means for receiving a RRC message including the indication that the CFR function is supported.

In some examples, to support receiving the control message, the CFR parameter component 730 is capable of, configured to, or operable to support a means for receiving an uplink control message or a downlink control message indicating the signal clipping level and the signal amplitude mirroring level associated with the CFR function.

Figure 8:
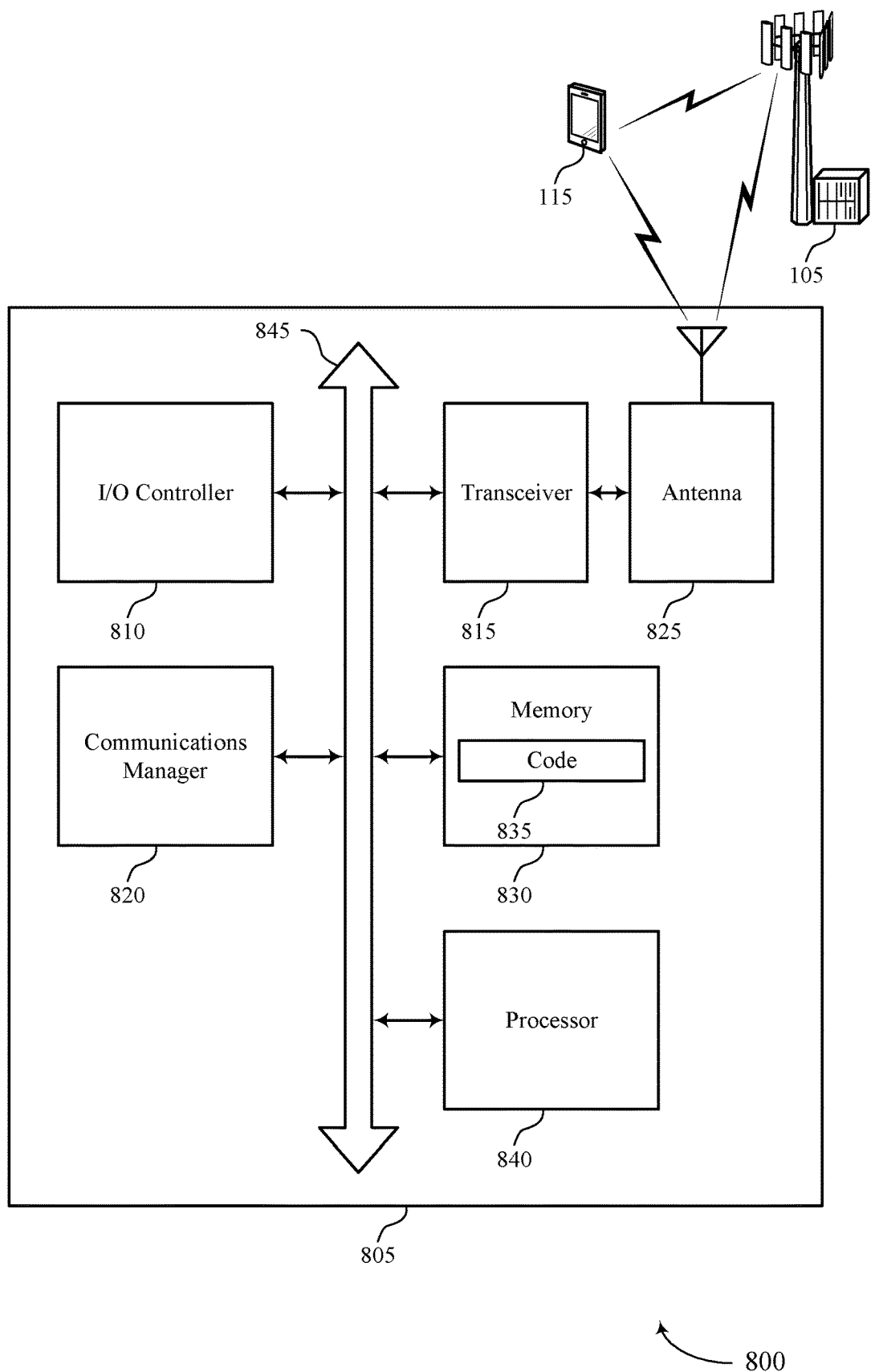
FIG. 8 shows a diagram of a system including a UE that supports amplitude mirroring detection using additional shared information in accordance with one or more aspects of the present disclosure.

FIG. 8 shows a diagram of a system 800 including a device 805 that supports amplitude mirroring detection using additional shared information in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently communicating multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting amplitude mirroring detection using additional shared information). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications at a first wireless device in accordance with examples as disclosed herein. For example, the communications manager 820 is capable of, configured to, or operable to support a means for communicating, with a second wireless device, control signaling including an indication that a CFR function is supported for waveform generation. The communications manager 820 is capable of, configured to, or operable to support a means for transmitting, to the second wireless device, a control message indicating a signal clipping level and a signal amplitude mirroring level associated with the CFR function. The communications manager 820 is capable of, configured to, or operable to support a means for transmitting, to the second wireless device, a waveform including a message, the waveform based on the CFR function, the signal clipping level, and the signal amplitude mirroring level.

Additionally, or alternatively, the communications manager 820 may support wireless communications at a second wireless device in accordance with examples as disclosed herein. For example, the communications manager 820 is capable of, configured to, or operable to support a means for communicating, with a first wireless device, control signaling including an indication that a CFR function is supported for waveform generation. The communications manager 820 is capable of, configured to, or operable to support a means for receiving, from the second wireless device, a control message indicating a signal clipping level and a signal amplitude mirroring level associated with the CFR function. The communications manager 820 is capable of, configured to, or operable to support a means for receiving, from the second wireless device, a waveform including a message, where the control message further indicates that the waveform is in accordance with the signal clipping level and the signal amplitude mirroring level associated with the CFR function.

By including or configuring the communications manager 820 in accordance with examples as described herein, the device 805 may support techniques for improved signal quality and reduced decoding error rates.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of amplitude mirroring detection using additional shared information as described herein, or the at least one processor 840 and the at least one memory 830 may be otherwise configured to, individually or collectively, perform or support such operations.

Figure 9:
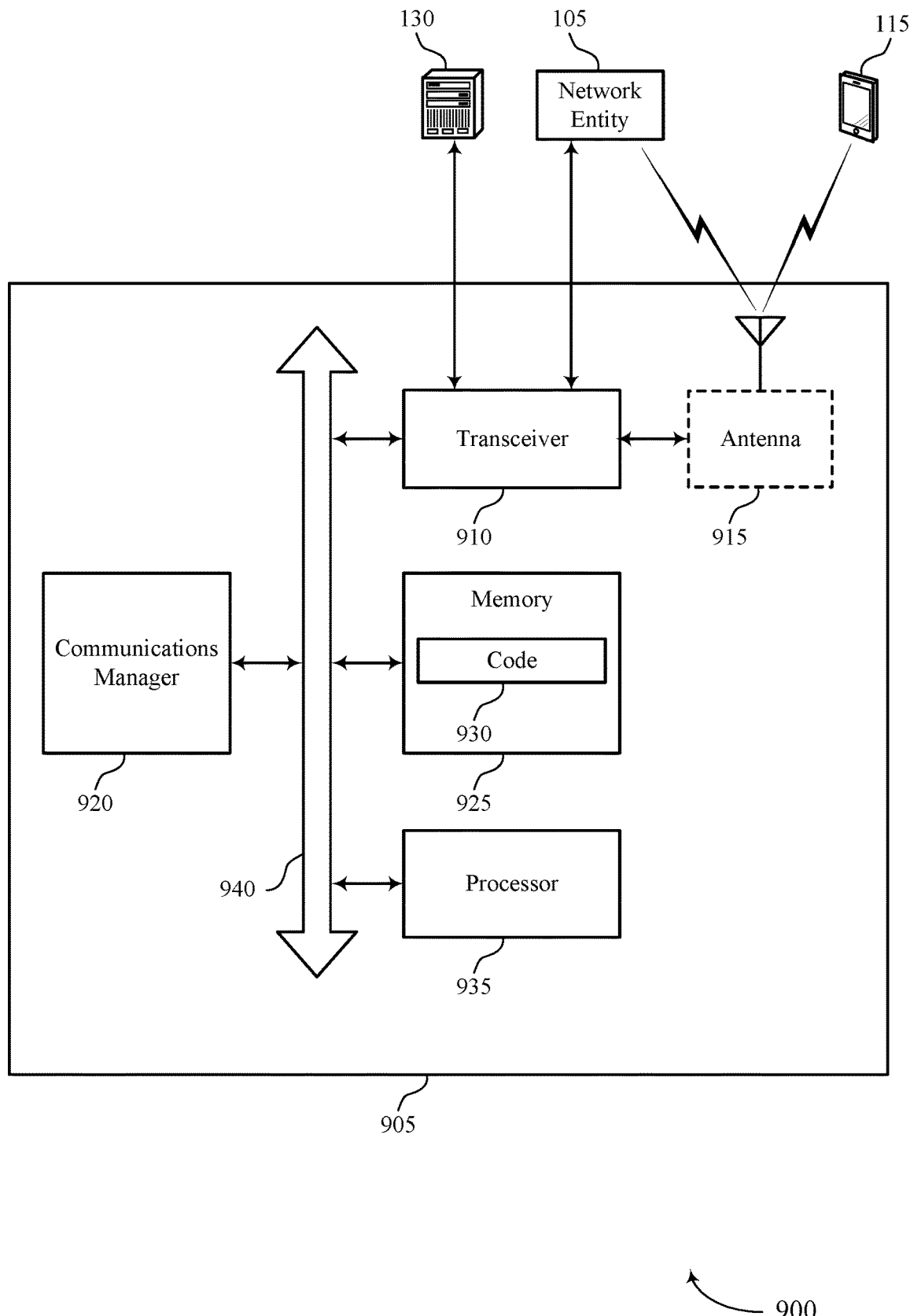
FIG. 9 shows a diagram of a system including a network entity that supports amplitude mirroring detection using additional shared information in accordance with one or more aspects of the present disclosure.

FIG. 9 shows a diagram of a system 900 including a device 905 that supports amplitude mirroring detection using additional shared information in accordance with one or more aspects of the present disclosure. The device 905 may be an example of or include the components of a device 505, a device 605, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, at least one memory 925, code 930, and at least one processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of communicating wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or one or more memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or one or more memory components (e.g., the at least one processor 935, the at least one memory 925, or both), may be included in a chip or chip assembly that is installed in the device 905. In some examples, the transceiver 910 may be operable to support communications via one or more communications links (e.g., a communication link 125, a backhaul communication link 120, a midhaul communication link 162, a fronthaul communication link 168).

The at least one memory 925 may include RAM, ROM, or any combination thereof. The at least one memory 925 may store computer-readable, computer-executable code 930 including instructions that, when executed by one or more of the at least one processor 935, cause the device 905 to perform various functions described herein. The code 930 may be stored in a non-transitory computer-readable medium such as system memory or another type of memory. In some cases, the code 930 may not be directly executable by a processor of the at least one processor 935 but may cause a computer (e.g., when compiled and executed) to perform functions described herein. In some cases, the at least one memory 925 may contain, among other things, a BIOS which may control basic hardware or software operation such as the interaction with peripheral components or devices. In some examples, the at least one processor 935 may include multiple processors and the at least one memory 925 may include multiple memories. One or more of the multiple processors may be coupled with one or more of the multiple memories which may, individually or collectively, be configured to perform various functions herein (for example, as part of a processing system).

The at least one processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 935 may be configured to operate a memory array using a memory controller. In some other cases, a memory controller may be integrated into one or more of the at least one processor 935. The at least one processor 935 may be configured to execute computer-readable instructions stored in a memory (e.g., one or more of the at least one memory 925) to cause the device 905 to perform various functions (e.g., functions or tasks supporting amplitude mirroring detection using additional shared information). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (e.g., one or more physical nodes and supporting software such as operating systems, virtual machines, or container instances) that may host the functions (e.g., by executing code 930) to perform the functions of the device 905. The at least one processor 935 may be any one or more suitable processors capable of executing scripts or instructions of one or more software programs stored in the device 905 (such as within one or more of the at least one memory 925). In some implementations, the at least one processor 935 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the at least one processor 935, or the transceiver 910, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 905 may transmit information output from the chip or modem. Additionally, or alternatively, in some implementations, the one or more interfaces may refer to an interface between the processing system of the chip or modem and a receiver, such that the device 905 may obtain information or signal inputs, and the information may be passed to the processing system. A person having ordinary skill in the art will readily recognize that a first interface also may obtain information or signal inputs, and a second interface also may output information or signal outputs.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the at least one memory 925, the code 930, and the at least one processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications at a first wireless device in accordance with examples as disclosed herein. For example, the communications manager 920 is capable of, configured to, or operable to support a means for communicating, with a second wireless device, control signaling including an indication that a CFR function is supported for waveform generation. The communications manager 920 is capable of, configured to, or operable to support a means for transmitting, to the second wireless device, a control message indicating a signal clipping level and a signal amplitude mirroring level associated with the CFR function. The communications manager 920 is capable of, configured to, or operable to support a means for transmitting, to the second wireless device, a waveform including a message, the waveform based on the CFR function, the signal clipping level, and the signal amplitude mirroring level.

Additionally, or alternatively, the communications manager 920 may support wireless communications at a second wireless device in accordance with examples as disclosed herein. For example, the communications manager 920 is capable of, configured to, or operable to support a means for communicating, with a first wireless device, control signaling including an indication that a CFR function is supported for waveform generation. The communications manager 920 is capable of, configured to, or operable to support a means for receiving, from the second wireless device, a control message indicating a signal clipping level and a signal amplitude mirroring level associated with the CFR function. The communications manager 920 is capable of, configured to, or operable to support a means for receiving, from the second wireless device, a waveform including a message, where the control message further indicates that the waveform is in accordance with the signal clipping level and the signal amplitude mirroring level associated with the CFR function.

By including or configuring the communications manager 920 in accordance with examples as described herein, the device 905 may support techniques for improved signal quality and reduced decoding error rates.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, one or more of the at least one processor 935, one or more of the at least one memory 925, the code 930, or any combination thereof (for example, by a processing system including at least a portion of the at least one processor 935, the at least one memory 925, the code 930, or any combination thereof). For example, the code 930 may include instructions executable by one or more of the at least one processor 935 to cause the device 905 to perform various aspects of amplitude mirroring detection using additional shared information as described herein, or the at least one processor 935 and the at least one memory 925 may be otherwise configured to, individually or collectively, perform or support such operations.

Figure 10:
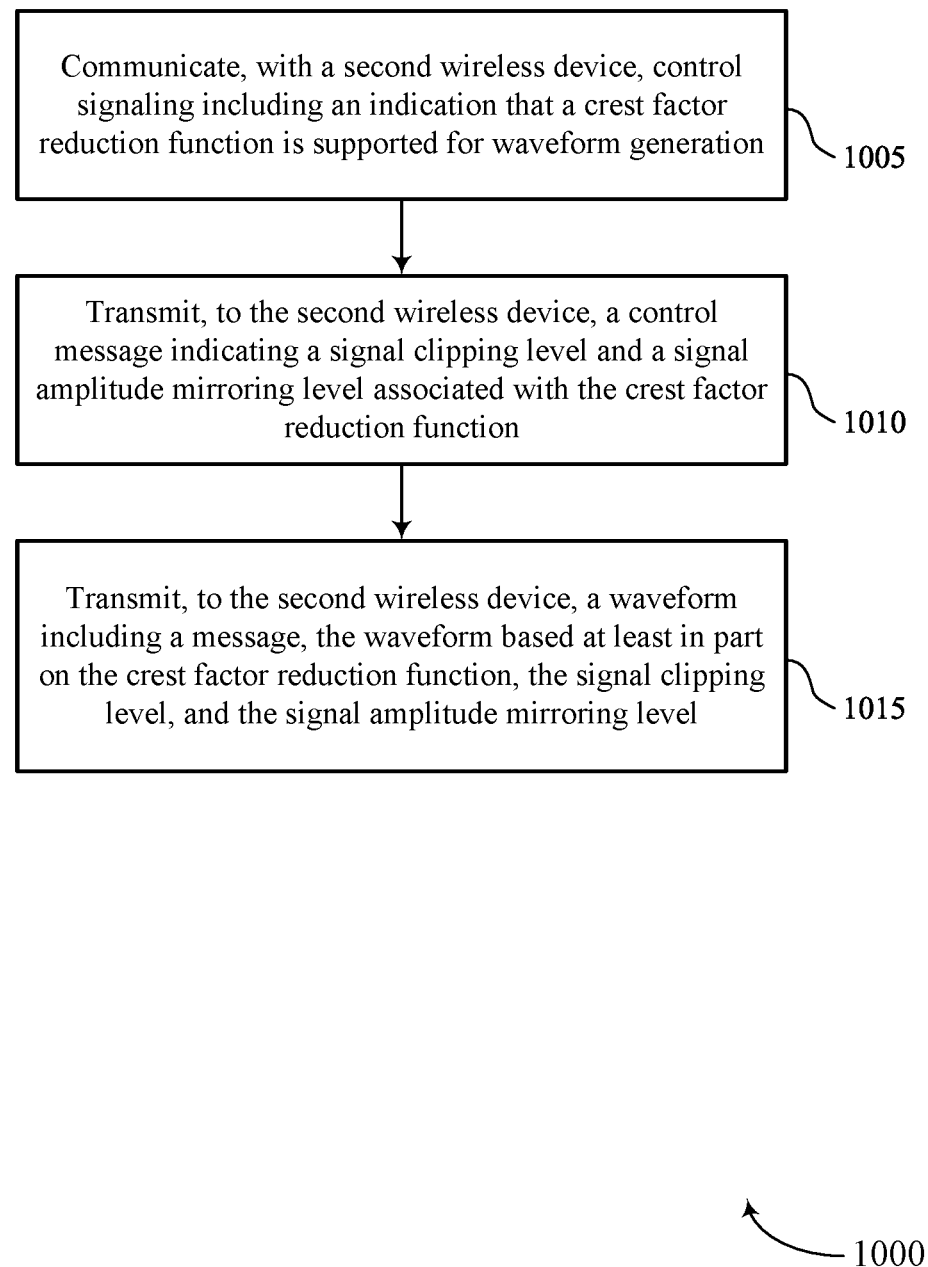
FIGS. 10 through 13 show flowcharts illustrating methods that support amplitude mirroring detection using additional shared information in accordance with one or more aspects of the present disclosure.

FIG. 10 shows a flowchart illustrating a method 1000 that supports amplitude mirroring detection using additional shared information in accordance with aspects of the present disclosure. The operations of the method 1000 may be implemented by a UE or a network entity or its components as described herein. For example, the operations of the method 1000 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1005, the method may include communicating, with a second wireless device, control signaling including an indication that a CFR function is supported for waveform generation. The operations of block 1005 may be performed in accordance with examples as disclosed herein. In some examples, aspects of the operations of 1005 may be performed by an CFR capability component 725 as described with reference to FIG. 7.

At 1010, the method may include transmitting, to the second wireless device, a control message indicating a signal clipping level and a signal amplitude mirroring level associated with the CFR function. The operations of block 1010 may be performed in accordance with examples as disclosed herein. In some examples, aspects of the operations of 1010 may be performed by an CFR parameter component 730 as described with reference to FIG. 7.

At 1015, the method may include transmitting, to the second wireless device, a waveform including a message, the waveform based on the CFR function, the signal clipping level, and the signal amplitude mirroring level. The operations of block 1015 may be performed in accordance with examples as disclosed herein. In some examples, aspects of the operations of 1015 may be performed by a waveform transmission component 735 as described with reference to FIG. 7.

Figure 11:
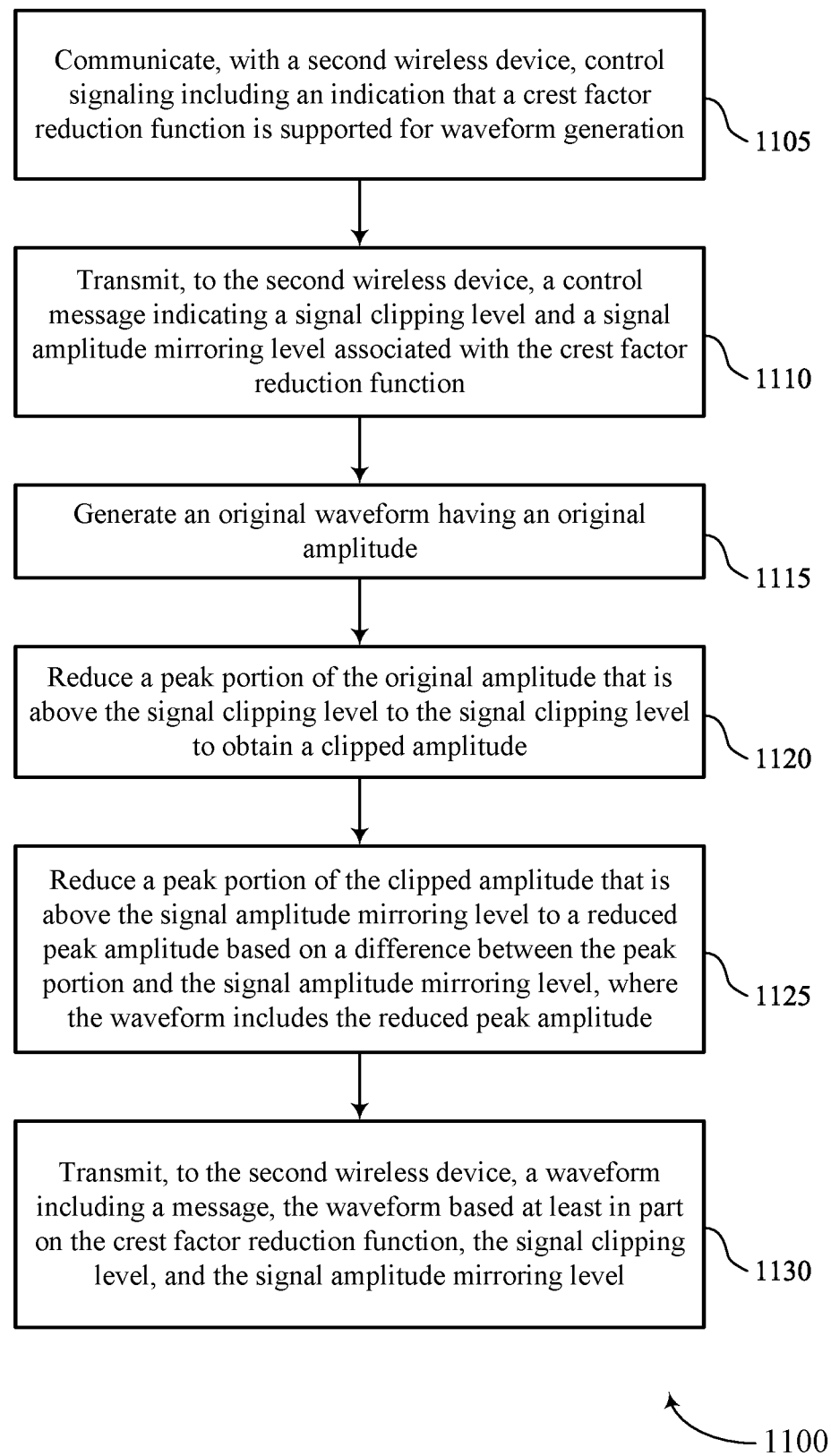

FIG. 11 shows a flowchart illustrating a method 1100 that supports amplitude mirroring detection using additional shared information in accordance with aspects of the present disclosure. The operations of the method 1100 may be implemented by a UE or a network entity or its components as described herein. For example, the operations of the method 1100 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1105, the method may include communicating, with a second wireless device, control signaling including an indication that a CFR function is supported for waveform generation. The operations of block 1105 may be performed in accordance with examples as disclosed herein. In some examples, aspects of the operations of 1105 may be performed by an CFR capability component 725 as described with reference to FIG. 7.

At 1110, the method may include transmitting, to the second wireless device, a control message indicating a signal clipping level and a signal amplitude mirroring level associated with the CFR function. The operations of block 1110 may be performed in accordance with examples as disclosed herein. In some examples, aspects of the operations of 1110 may be performed by an CFR parameter component 730 as described with reference to FIG. 7.

At 1115, the method may include generating an original waveform having an original amplitude. The operations of block 1115 may be performed in accordance with examples as disclosed herein. In some examples, aspects of the operations of 1115 may be performed by a waveform generating component 755 as described with reference to FIG. 7.

At 1120, the method may include reducing a peak portion of the original amplitude that is above the signal clipping level to the signal clipping level to obtain a clipped amplitude. The operations of block 1120 may be performed in accordance with examples as disclosed herein. In some examples, aspects of the operations of 1120 may be performed by a waveform generating component 755 as described with reference to FIG. 7.

At 1125, the method may include reducing a peak portion of the clipped amplitude that is above the signal amplitude mirroring level to a reduced peak amplitude based on a difference between the peak portion and the signal amplitude mirroring level, where the waveform includes the reduced peak amplitude. The operations of block 1125 may be performed in accordance with examples as disclosed herein. In some examples, aspects of the operations of 1125 may be performed by a waveform generating component 755 as described with reference to FIG. 7.

At 1130, the method may include transmitting, to the second wireless device, a waveform including a message, the waveform based on the CFR function, the signal clipping level, and the signal amplitude mirroring level. The operations of block 1130 may be performed in accordance with examples as disclosed herein. In some examples, aspects of the operations of 1130 may be performed by a waveform transmission component 735 as described with reference to FIG. 7.

Figure 12:
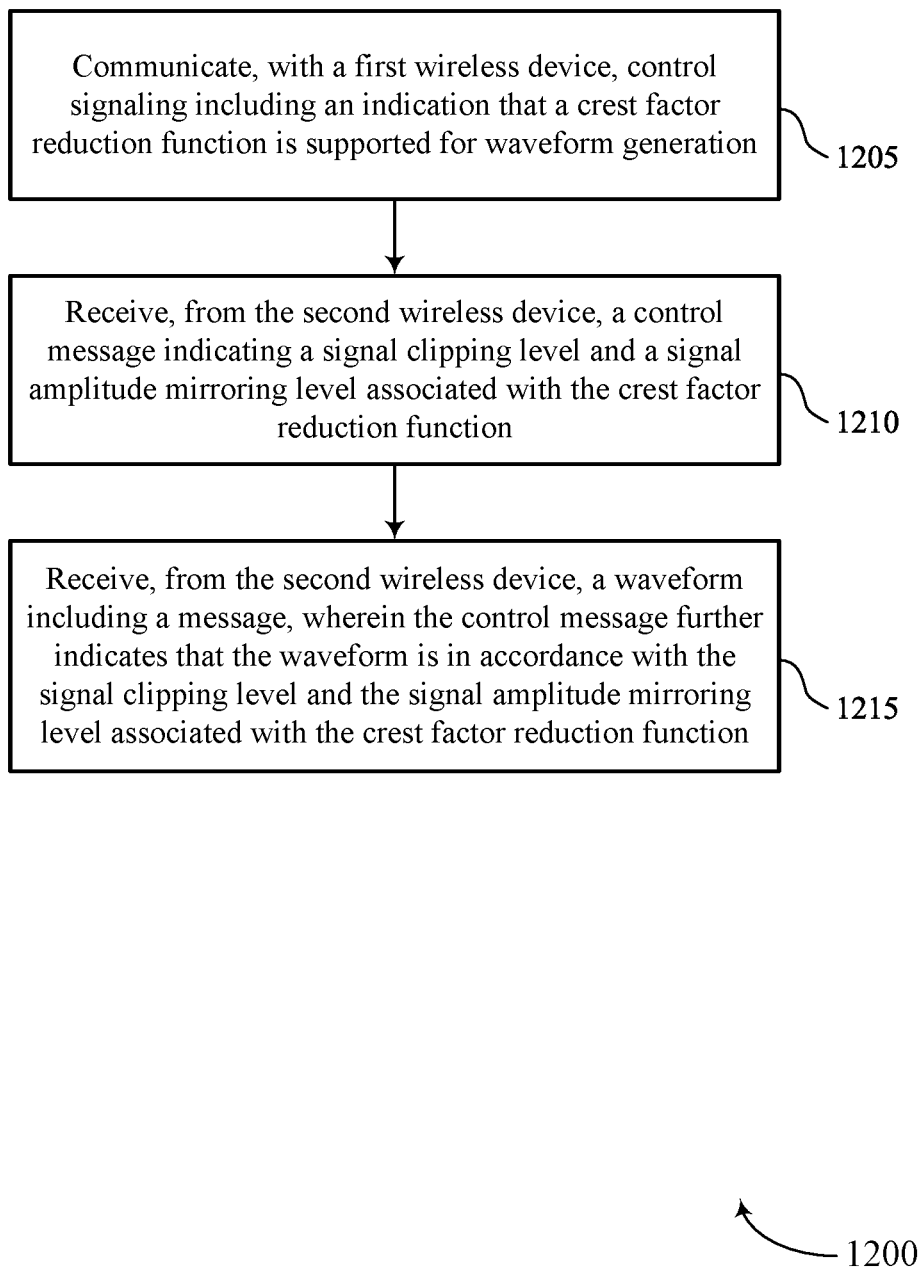

FIG. 12 shows a flowchart illustrating a method 1200 that supports amplitude mirroring detection using additional shared information in accordance with aspects of the present disclosure. The operations of the method 1200 may be implemented by a UE or a network entity or its components as described herein. For example, the operations of the method 1200 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1205, the method may include communicating, with a first wireless device, control signaling including an indication that a CFR function is supported for waveform generation. The operations of block 1205 may be performed in accordance with examples as disclosed herein. In some examples, aspects of the operations of 1205 may be performed by an CFR capability component 725 as described with reference to FIG. 7.

At 1210, the method may include receiving, from the second wireless device, a control message indicating a signal clipping level and a signal amplitude mirroring level associated with the CFR function. The operations of block 1210 may be performed in accordance with examples as disclosed herein. In some examples, aspects of the operations of 1210 may be performed by an CFR parameter reception component 740 as described with reference to FIG. 7.

At 1215, the method may include receiving, from the second wireless device, a waveform including a message, where the control message further indicates that the waveform is in accordance with the signal clipping level and the signal amplitude mirroring level associated with the CFR function. The operations of block 1215 may be performed in accordance with examples as disclosed herein. In some examples, aspects of the operations of 1215 may be performed by a waveform reception component 745 as described with reference to FIG. 7.

Figure 13:
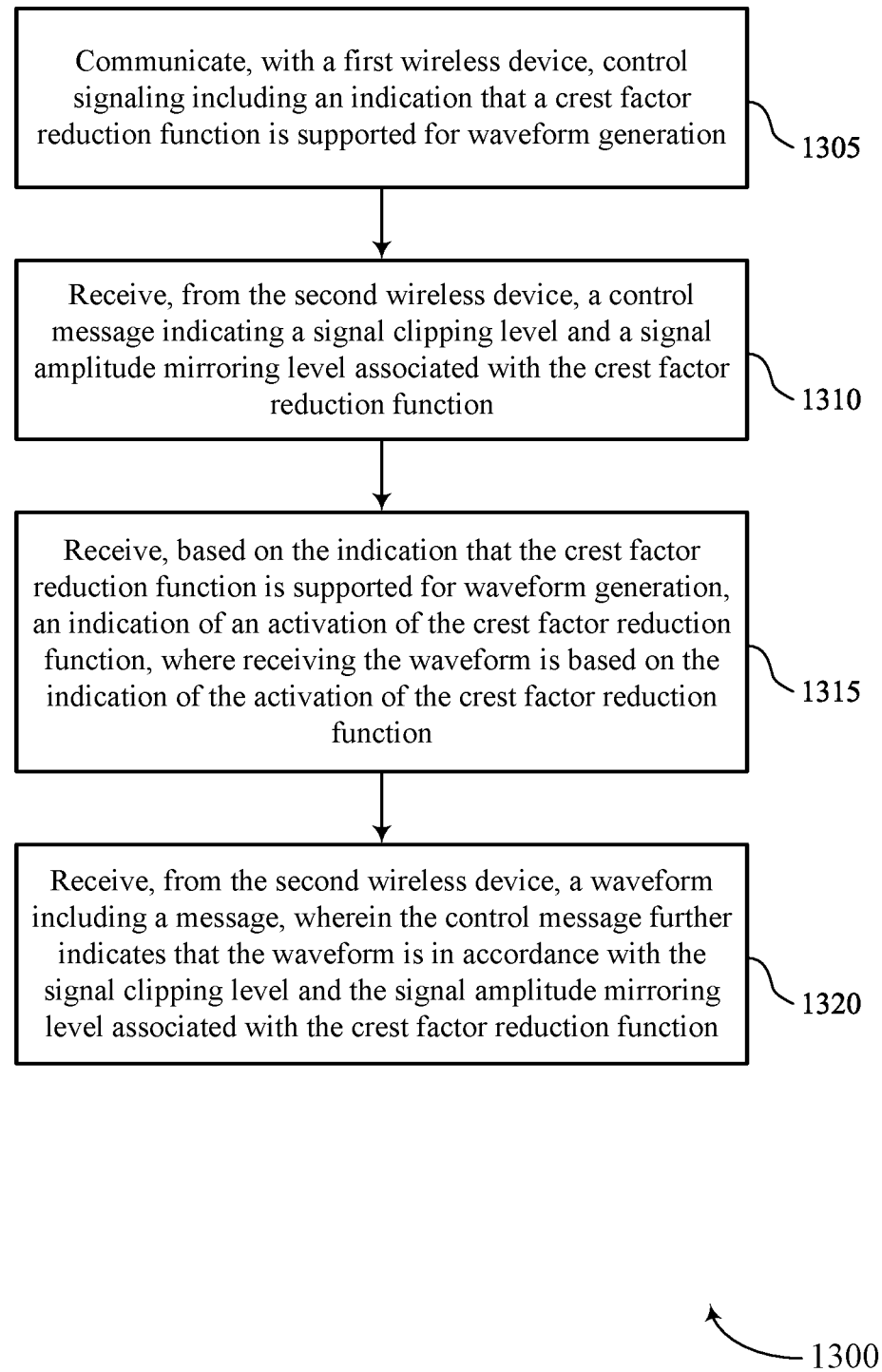

FIG. 13 shows a flowchart illustrating a method 1300 that supports amplitude mirroring detection using additional shared information in accordance with aspects of the present disclosure. The operations of the method 1300 may be implemented by a UE or a network entity or its components as described herein. For example, the operations of the method 1300 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1305, the method may include communicating, with a first wireless device, control signaling including an indication that a CFR function is supported for waveform generation. The operations of block 1305 may be performed in accordance with examples as disclosed herein. In some examples, aspects of the operations of 1305 may be performed by an CFR capability component 725 as described with reference to FIG. 7.

At 1310, the method may include receiving, from the second wireless device, a control message indicating a signal clipping level and a signal amplitude mirroring level associated with the CFR function. The operations of block 1310 may be performed in accordance with examples as disclosed herein. In some examples, aspects of the operations of 1310 may be performed by an CFR parameter reception component 740 as described with reference to FIG. 7.

At 1315, the method may include receiving, based on the indication that the CFR function is supported for waveform generation, an indication of an activation of the CFR function, where receiving the waveform is based on the indication of the activation of the CFR function. The operations of block 1315 may be performed in accordance with examples as disclosed herein. In some examples, aspects of the operations of 1315 may be performed by an CFR activation component 765 as described with reference to FIG. 7.

At 1320, the method may include receiving, from the second wireless device, a waveform including a message, where the control message further indicates that the waveform is in accordance with the signal clipping level and the signal amplitude mirroring level associated with the CFR function. The operations of block 1320 may be performed in accordance with examples as disclosed herein. In some examples, aspects of the operations of 1320 may be performed by a waveform reception component 745 as described with reference to FIG. 7.

The following provides an overview of aspects of the present disclosure:

Aspect 1: A method for wireless communications at a first wireless device, comprising: communicating, with a second wireless device, control signaling comprising an indication that a CFR function is supported for waveform generation; transmitting, to the second wireless device, a control message indicating a signal clipping level and a signal amplitude mirroring level associated with the CFR function; and transmitting, to the second wireless device, a waveform comprising a message, the waveform based at least in part on the CFR function, the signal clipping level, and the signal amplitude mirroring level.

Aspect 2: The method of aspect 1, further comprising: transmitting, based at least in part on the indication that the CFR function is supported for waveform generation, an indication of an activation of the CFR function.

Aspect 3: The method of aspect 2, further comprising: transmitting, based at least in part on the indication that the CFR function is supported for waveform generation, an indication of a deactivation of the CFR function.

Aspect 4: The method of any of aspects 1 through 3, wherein the control message indicates a minimum threshold time duration between a beginning of an amplitude mirroring instance and an ending of the amplitude mirroring instance, a maximum threshold time duration between the beginning of the amplitude mirroring instance and the ending of the amplitude mirroring instance, or both.

Aspect 5: The method of any of aspects 1 through 4, further comprising: generating an original waveform having an original amplitude; reducing a peak portion of the original amplitude that is above the signal clipping level to the signal clipping level to obtain a clipped amplitude; and reducing a peak portion of the clipped amplitude that is above the signal amplitude mirroring level to a reduced peak amplitude based at least in part on a difference between the peak portion and the signal amplitude mirroring level, wherein the waveform comprises the reduced peak amplitude.

Aspect 6: The method of any of aspects 1 through 5, further comprising: receiving a grant scheduling transmission of the message within a resource used to transmit the waveform, wherein the first wireless device is a UE, and the second wireless device is a network entity.

Aspect 7: The method of any of aspects 1 through 6, further comprising: transmitting a grant scheduling transmission of the message within a resource used to transmit the waveform, wherein the first wireless device is a network entity, and the second wireless device is a UE.

Aspect 8: The method of any of aspects 1 through 7, wherein communicating the control signaling comprises: transmitting a RRC message comprising the indication that the CFR function is supported.

Aspect 9: The method of any of aspects 1 through 8, wherein transmitting the control message comprises: transmitting an uplink control message or a downlink control message indicating the signal clipping level and the signal amplitude mirroring level associated with the CFR function.

Aspect 10: A method for wireless communications at a second wireless device, comprising: communicating, with a first wireless device, control signaling comprising an indication that a CFR function is supported for waveform generation; receiving, from the second wireless device, a control message indicating a signal clipping level and a signal amplitude mirroring level associated with the CFR function; and receiving, from the second wireless device, a waveform comprising a message, wherein the control message further indicates that the waveform is in accordance with the signal clipping level and the signal amplitude mirroring level associated with the CFR function.

Aspect 11: The method of aspect 10, further comprising: receiving, based at least in part on the indication that the CFR function is supported for waveform generation, an indication of an activation of the CFR function, wherein receiving the waveform is based at least in part on the indication of the activation of the CFR function.

Aspect 12: The method of aspect 11, further comprising: receiving, based at least in part on the indication that the CFR function is supported for waveform generation, an indication of a deactivation of the CFR function.

Aspect 13: The method of any of aspects 10 through 12, wherein the control message indicates a minimum threshold time duration between a beginning of an amplitude mirroring instance and an ending of the amplitude mirroring instance, a maximum threshold time duration between the beginning of the amplitude mirroring instance and the ending of the amplitude mirroring instance, or both.

Aspect 14: The method of any of aspects 10 through 13, further comprising: increasing an amplitude of a mirrored portion of the waveform based at least in part on a difference between the amplitude of the mirrored portion and the signal amplitude mirroring level.

Aspect 15: The method of any of aspects 10 through 14, further comprising: receiving a grant scheduling transmission of the message within a resource used to transmit the waveform, wherein the second wireless device is a UE, and the first wireless device is a network entity.

Aspect 16: The method of any of aspects 10 through 15, further comprising: transmitting a grant scheduling transmission of the message within a resource used to transmit the waveform, wherein the second wireless device is a network entity, and the first wireless device is a UE.

Aspect 17: The method of any of aspects 10 through 16, wherein communicating the control signaling comprises: receiving a RRC message comprising the indication that the CFR function is supported.

Aspect 18: The method of any of aspects 10 through 17, wherein receiving the control message comprises: receiving an uplink control message or a downlink control message indicating the signal clipping level and the signal amplitude mirroring level associated with the CFR function.

Aspect 19: A first wireless device for wireless communications, comprising one or more memories storing processor-executable code, and one or more processors coupled with the one or more memories and individually or collectively operable to execute the code to cause the first wireless device to perform a method of any of aspects 1 through 9.

Aspect 20: A first wireless device for wireless communications, comprising at least one means for performing a method of any of aspects 1 through 9.

Aspect 21: A non-transitory computer-readable medium storing code for wireless communications, the code comprising instructions executable by a processor to perform a method of any of aspects 1 through 9.

Aspect 22: A second wireless device for wireless communications, comprising one or more memories storing processor-executable code, and one or more processors coupled with the one or more memories and individually or collectively operable to execute the code to cause the second wireless device to perform a method of any of aspects 10 through 18.

Aspect 23: A second wireless device for wireless communications, comprising at least one means for performing a method of any of aspects 10 through 18.

Aspect 24: A non-transitory computer-readable medium storing code for wireless communications, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device for wireless communication, comprising:
   one or more memories storing processor-executable code; and
   one or more processors coupled with the one or more memories and individually or collectively operable to execute the code to cause the first wireless device to:
   communicate, with a second wireless device, control signaling comprising an indication that a crest factor reduction function is supported for waveform generation;
   transmit, to the second wireless device, a control message indicating a signal clipping level and a signal amplitude mirroring level associated with the crest factor reduction function; and
   transmit, to the second wireless device, a waveform comprising a message, the waveform based at least in part on the crest factor reduction function, the signal clipping level, and the signal amplitude mirroring level.

2. The first wireless device of claim 1, wherein the one or more processors are individually or collectively further operable to execute the code to cause the first wireless device to:
   transmit, based at least in part on the indication that the crest factor reduction function is supported for waveform generation, an indication of an activation of the crest factor reduction function.

3. The first wireless device of claim 2, wherein the one or more processors are individually or collectively further operable to execute the code to cause the first wireless device to:
   transmit, based at least in part on the indication that the crest factor reduction function is supported for waveform generation, an indication of a deactivation of the crest factor reduction function.

4. The first wireless device of claim 1, wherein the control message indicates a minimum threshold time duration between a beginning of an amplitude mirroring instance and an ending of the amplitude mirroring instance, a maximum threshold time duration between the beginning of the amplitude mirroring instance and the ending of the amplitude mirroring instance, or both.

5. The first wireless device of claim 1, wherein the one or more processors are individually or collectively further operable to execute the code to cause the first wireless device to:
   generate an original waveform having an original amplitude;
   reduce a peak portion of the original amplitude that is above the signal clipping level to the signal clipping level to obtain a clipped amplitude; and
   reduce a peak portion of the clipped amplitude that is above the signal amplitude mirroring level to a reduced peak amplitude based at least in part on a difference between the peak portion and the signal amplitude mirroring level, wherein the waveform comprises the reduced peak amplitude.

6. The first wireless device of claim 1, wherein the one or more processors are individually or collectively further operable to execute the code to cause the first wireless device to:
   receive a grant scheduling transmission of the message within a resource used to transmit the waveform, wherein the first wireless device is a user equipment (UE), and the second wireless device is a network entity.

7. The first wireless device of claim 1, wherein the one or more processors are individually or collectively further operable to execute the code to cause the first wireless device to:
   transmit a grant scheduling transmission of the message within a resource used to transmit the waveform, wherein the first wireless device is a network entity, and the second wireless device is a user equipment (UE).

8. The first wireless device of claim 1, wherein to communicate the control signaling, the one or more processors are individually or collectively further operable to execute the code to cause the first wireless device to:
   transmit a radio resource control message comprising the indication that the crest factor reduction function is supported.

9. The first wireless device of claim 1, wherein to transmit the control message, the one or more processors are individually or collectively further operable to execute the code to cause the first wireless device to:

transmit an uplink control message or a downlink control message indicating the signal clipping level and the signal amplitude mirroring level associated with the crest factor reduction function.

10. A second wireless device for wireless communications, comprising:

one or more memories storing processor-executable code; and one or more processors coupled with the one or more memories and individually or collectively operable to execute the code to cause the second wireless device to:

communicate, with a first wireless device, control signaling comprising an indication that a crest factor reduction function is supported for waveform generation;

receive, from the first wireless device, a control message indicating a signal clipping level and a signal amplitude mirroring level associated with the crest factor reduction function; and receive, from the first wireless device, a waveform comprising a message, wherein the control message further indicates that the waveform is in accordance with the signal clipping level and the signal amplitude mirroring level associated with the crest factor reduction function.

11. The second wireless device of claim 10, wherein the one or more processors are individually or collectively further operable to execute the code to cause the second wireless device to:

receive, based at least in part on the indication that the crest factor reduction function is supported for waveform generation, an indication of an activation of the crest factor reduction function, wherein receiving the waveform is based at least in part on the indication of the activation of the crest factor reduction function.

12. The second wireless device of claim 11, wherein the one or more processors are individually or collectively further operable to execute the code to cause the second wireless device to:

receive, based at least in part on the indication that the crest factor reduction function is supported for waveform generation, an indication of a deactivation of the crest factor reduction function.

13. The second wireless device of claim 10, wherein the control message indicates a minimum threshold time duration between a beginning of an amplitude mirroring instance and an ending of the amplitude mirroring instance, a maximum threshold time duration between the beginning of the amplitude mirroring instance and the ending of the amplitude mirroring instance, or both.

14. The second wireless device of claim 10, wherein the one or more processors are individually or collectively further operable to execute the code to cause the second wireless device to:

increase an amplitude of a mirrored portion of the waveform based at least in part on a difference between the amplitude of the mirrored portion and the signal amplitude mirroring level.

15. The second wireless device of claim 10, wherein the one or more processors are individually or collectively further operable to execute the code to cause the second wireless device to:

transmit a grant scheduling transmission of the message within a resource used to transmit the waveform, wherein the second wireless device is a network entity, and the first wireless device is a user equipment (UE).

16. The second wireless device of claim 10, wherein the one or more processors are individually or collectively further operable to execute the code to cause the second wireless device to:

receive a grant scheduling transmission of the message within a resource used to transmit the waveform, wherein the second wireless device is a user equipment (UE), and the first wireless device is a network entity.

17. The second wireless device of claim 10, wherein to communicate the control signaling, the one or more processors are individually or collectively further operable to execute the code to cause the second wireless device to:

receive a radio resource control message comprising the indication that the crest factor reduction function is supported.

18. The second wireless device of claim 10, wherein to receive the control message, the one or more processors are individually or collectively further operable to execute the code to cause the second wireless device to:

receive an uplink control message or a downlink control message indicating the signal clipping level and the signal amplitude mirroring level associated with the crest factor reduction function.

19. A method for wireless communications by a first wireless device, comprising:

communicating, with a second wireless device, control signaling comprising an indication that a crest factor reduction function is supported for waveform generation;

transmitting, to the second wireless device, a control message indicating a signal clipping level and a signal amplitude mirroring level associated with the crest factor reduction function; and transmitting, to the second wireless device, a waveform comprising a message, the waveform based at least in part on the crest factor reduction function, the signal clipping level, and the signal amplitude mirroring level.

20. The method of claim 19, further comprising:

transmitting, based at least in part on the indication that the crest factor reduction function is supported for waveform generation, an indication of an activation of the crest factor reduction function.

21. The method of claim 20, further comprising:

transmitting, based at least in part on the indication that the crest factor reduction function is supported for waveform generation, an indication of a deactivation of the crest factor reduction function.

22. The method of claim 19, wherein the control message indicates a minimum threshold time duration between a beginning of an amplitude mirroring instance and an ending of the amplitude mirroring instance, a maximum threshold time duration between the beginning of the amplitude mirroring instance and the ending of the amplitude mirroring instance, or both.

23. The method of claim 19, further comprising:

generating an original waveform having an original amplitude;

reducing a peak portion of the original amplitude that is above the signal clipping level to the signal clipping level to obtain a clipped amplitude; and reducing a peak portion of the clipped amplitude that is above the signal amplitude mirroring level to a reduced peak amplitude based at least in part on a difference between the peak portion and the signal amplitude mirroring level, wherein the waveform comprises the reduced peak amplitude.

24. The method of claim 19, further comprising:
receiving a grant scheduling transmission of the message within a resource used to transmit the waveform, wherein the first wireless device is a user equipment (UE), and the second wireless device is a network entity.

25. The method of claim 19, further comprising:
transmitting a grant scheduling transmission of the message within a resource used to transmit the waveform, wherein the first wireless device is a network entity, and the second wireless device is a user equipment (UE).

26. The method of claim 19, wherein communicating the control signaling comprises:
transmitting a radio resource control message comprising the indication that the crest factor reduction function is supported.

27. The method of claim 19, wherein transmitting the control message comprises:
transmitting an uplink control message or a downlink control message indicating the signal clipping level and the signal amplitude mirroring level associated with the crest factor reduction function.

28. A method for wireless communications by a second wireless device, comprising:
communicating, with a first wireless device, control signaling comprising an indication that a crest factor reduction function is supported for waveform generation;
receiving, from the first wireless device, a control message indicating a signal clipping level and a signal amplitude mirroring level associated with the crest factor reduction function; and
receiving, from the first wireless device, a waveform comprising a message, wherein the control message further indicates that the waveform is in accordance with the signal clipping level and the signal amplitude mirroring level associated with the crest factor reduction function.

29. The method of claim 28, further comprising:
receiving, based at least in part on the indication that the crest factor reduction function is supported for waveform generation, an indication of an activation of the crest factor reduction function, wherein receiving the waveform is based at least in part on the indication of the activation of the crest factor reduction function.

30. The method of claim 29, further comprising:
receiving, based at least in part on the indication that the crest factor reduction function is supported for waveform generation, an indication of a deactivation of the crest factor reduction function.

* * * * *